United States Patent
Otake

(10) Patent No.: US 7,016,066 B2
(45) Date of Patent: Mar. 21, 2006

(54) IMAGE OUTPUT CONTROL APPARATUS, IMAGE OUTPUT CONTROL METHOD, AND STORAGE MEDIUM, FOR SELECTING BETWEEN FIRST AND SECOND OUTPUT MODES

(75) Inventor: Ritsuko Otake, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 1081 days.

(21) Appl. No.: 09/761,759

(22) Filed: Jan. 18, 2001

(65) Prior Publication Data

US 2001/0024292 A1    Sep. 27, 2001

(30) Foreign Application Priority Data

Jan. 20, 2000    (JP)    ............... 2000-011761
Jan. 10, 2001    (JP)    ............... 2001-002506

(51) Int. Cl.
*B41F 16/00*    (2006.01)
*G06F 15/00*    (2006.01)

(52) U.S. Cl. ............... 358/1.15; 358/1.13; 355/112

(58) Field of Classification Search ............... 358/1.15, 358/1.13, 296; 399/8
See application file for complete search history.

(56) References Cited

U.S. PATENT DOCUMENTS

| | | | | |
|---|---|---|---|---|
| 5,287,194 A | * | 2/1994 | Lobiondo | .................. 358/296 |
| 5,689,755 A | * | 11/1997 | Ataka | ............................ 399/8 |
| 6,064,836 A | * | 5/2000 | Nakamura et al. | ............. 399/8 |
| 6,256,107 B1 | * | 7/2001 | Toda | ......................... 358/1.15 |
| 6,597,469 B1 | * | 7/2003 | Kuroyanagi | ............... 358/1.15 |
| 6,674,545 B1 | * | 1/2004 | Atsumi | ....................... 358/1.9 |

FOREIGN PATENT DOCUMENTS

| | | |
|---|---|---|
| JP | 7-152510 | 6/1995 |
| JP | 10-161820 | 6/1998 |
| JP | 11-119945 | 4/1999 |

* cited by examiner

*Primary Examiner*—King Y. Poon
*Assistant Examiner*—Lucas Divine
(74) *Attorney, Agent, or Firm*—Fitzpztrick, Cella, Harper & Scinto

(57) ABSTRACT

An image output control apparatus, an image output control method for such an image output control apparatus, and a storage medium, in which, the total number of output copies when image data input by an image input device is output by plural image output devices is set, and the total number of output copies is distributed to the respective image output devices outputting the image data on the basis of distribution priority order previously stored in a memory and for distributing the total number of output copies to the plural image output devices. Thus, even after the plural image output devices for performing the image output are specified, distribution control based on the distribution priority order for the plural image output devices is enabled.

22 Claims, 17 Drawing Sheets

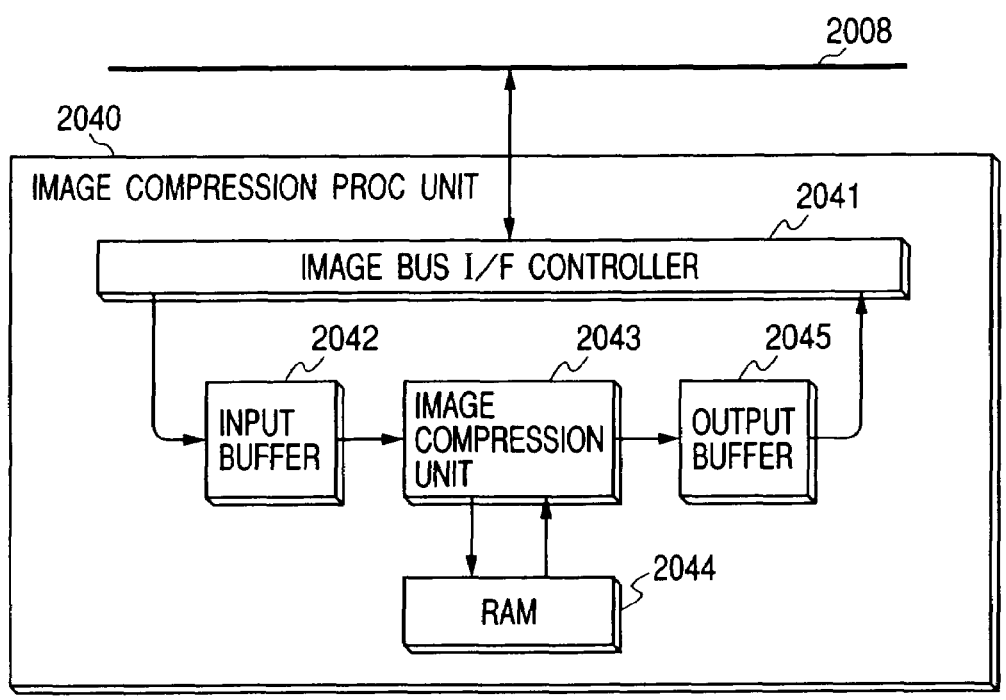
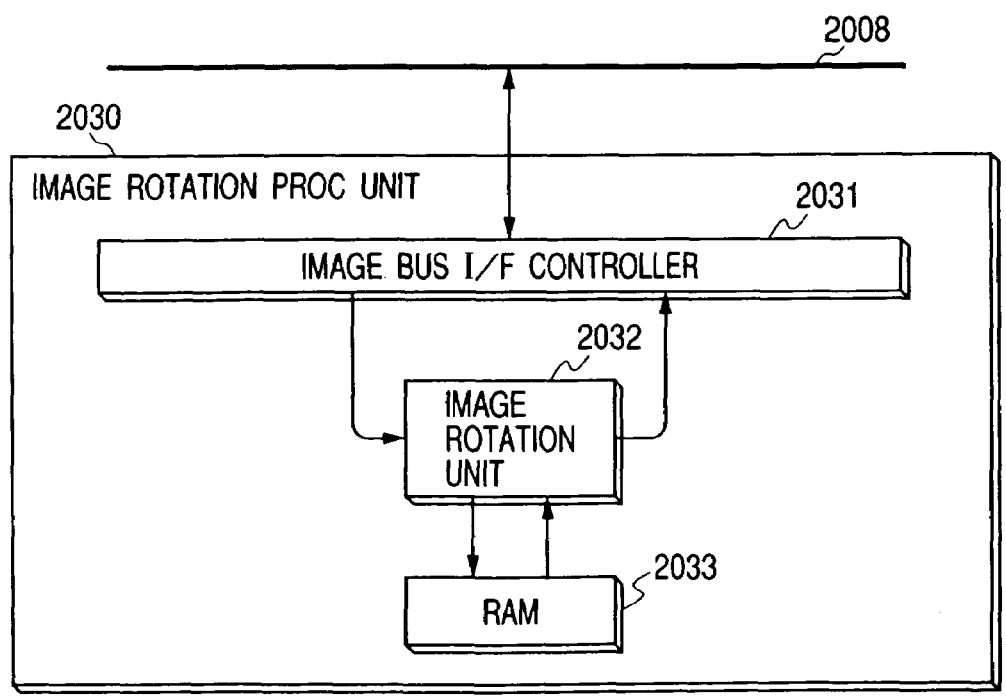

FIG. 10
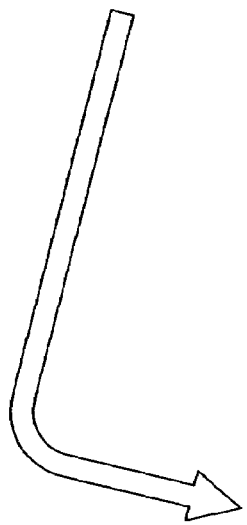
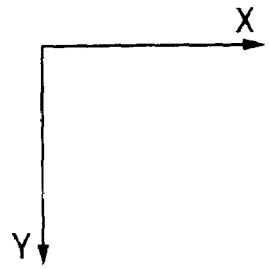

FIG. 14

| PRIORITY ORDER | OUTPUT DEVICE | LIMITATION VALUE |
|---|---|---|
| 1 | PRINTER 1 | 15 |
| 2 | PRINTER 2 | 20 |

FIG. 15

| PRIORITY ORDER | PRINTER NAME | LIMITATION VALUE |
|---|---|---|
| (1) | PRINTER 1 | 15 |
| (2) | PRINTER 2 | 20 |
| (3) | PRINTER 3 | 30 |
| (4) | PRINTER 4 | 10 |

| PRIORITY ORDER | PRINTER NAME | LIMITATION VALUE |
|---|---|---|
| (1) | PRINTER 1 | 15 |
| (2) | PRINTER 2 | 20 |
| (3) | PRINTER 3 | 30 |
| (4) | PRINTER 4 | 10 |

GROUP NAME: LOCAL OUTPUT PRIORITY

[READ] [REGISTER] [OK]

| PRIORITY SETTING | OUTPUT DEVICE | LIMITATION VALUE | PRIORITY ORDER | THE SET NUMBER OF COPIES | | | | |
|---|---|---|---|---|---|---|---|---|
| | | | | 10 | 20 | 30 | 50 | 100 |
| LOCAL PRIORITY SETTING | PRINTER 1 | 15 | 1 | 10 | 15 | 15 | 15 | 34 (23) |
| | PRINTER 2 | 20 | 2 | 0 | 5 | 15 | 20 | 33 (30) |
| | PRINTER 3 | 30 | 3 | 0 | 0 | 0 | 15 | 33 (47) |
| FINISHER OPERATION PRIORITY SETTING | PRINTER 1 | 15 | 3 | 0 | 0 | 0 | 0 | 33 (24) |
| | PRINTER 2 | 20 | 2 | 0 | 0 | 0 | 20 | 33 (30) |
| | PRINTER 3 | 30 | 1 | 10 | 20 | 30 | 30 | 34 (46) |

FIG. 23

STORAGE MEDIUM SUCH AS FD, CD-ROM ETC.

| DIRECTORY INFORMATION |
|---|
| 1ST DATA PROC PROGRAM<br>PROGRAM CODE GROUP CORRESPONDING TO STEPS OF FLOW CHART IN FIG.16 |
| 2ND DATA PROC PROGRAM<br>PROGRAM CODE GROUP CORRESPONDING TO STEPS OF FLOW CHART IN FIG.17 |
| 3RD DATA PROC PROGRAM<br>PROGRAM CODE GROUP CORRESPONDING TO STEPS OF FLOW CHART IN FIG.20 |
| |

MEMORY MAP OF STORAGE MEDIUM

IMAGE OUTPUT CONTROL APPARATUS, IMAGE OUTPUT CONTROL METHOD, AND STORAGE MEDIUM, FOR SELECTING BETWEEN FIRST AND SECOND OUTPUT MODES

BACKGROUND OF THE INVENTION

1. Field of the Invention

The present invention relates to an image output control apparatus which connects to an input device for inputting image data and plural image output devices through a communication medium, and can control image output by the plural image output devices. The invention also relates to an image output control method for such an image output control apparatus, and a storage medium. In particular, the present invention relates to an image output control apparatus which can flexibly comply with an operator's various requests by enabling, even after specifying the plural image output devices performing image output, distribution control of the number of copies between the plural image output devices on the basis of distribution priority order. The present invention also relates to an image output control method for such an image output control apparatus, and a storage medium.

2. Related Background Art

Conventionally, an image processing system is known which connects plural image output devices (such as a digital copying machine, a printer, and the like) with an image input device (such as a scanner or the like) through a communication medium, and enables an operation mode called "cluster printing" to cause the plural image output devices to output image data input by the image input device.

In this image processing system, for example, when the original of a large number of copies is subjected to copying, a cluster copying mode can be selected. In this mode, the set number of copies is distributed to each of the plural image output devices, whereby the copying can be performed dispersively. Thus, as compared with a case where the set number of copies is subjected to the copying with one image output device, the copying time is shortened, whereby image output productivity can be improved.

Further, in recent years, with the organization of network environment, an image processing system can be structured with plural image output devices each, of which has different features (speed and function) and is apart from the others.

In such an image processing system, an operator occasionally hopes that he/she will preferentially use, in the plural image output devices, not only the device of which output speed is high but also the device with high image quality or excellent cost performance. Further, to reduce the time for sheet collection after the copying ends, the operator occasionally wants to output images by preferentially using the image output device at the nearest place possible. Conversely, for the convenience of working after the sheets are collected, the operator occasionally wants to output the images by intentionally using an image output device at a remote place preferentially.

However, in order to perform such priority outputting based on the image quality, the cost, the setting place, and the like, it is necessary for the operator to check or know the features, the location, and the like, of each image output device every time the image outputting is performed. Thus, as the number of image output devices constituting the system increases, selection and setting of the devices becomes complex and time-consuming.

In order to cope with such a problem as described above, for example, in the print information generation apparatus and method disclosed in Japanese Patent Application Laid-Open No. 10-161820, plural image formation apparatuses are previously registered as output destinations, and also the priority of each image formation apparatus is previously registered. Then, the driver software automatically discriminates and selects the image output device optimum for an output original, whereby a more convenient user interface can be provided to an operator.

Further, in the automatic printer selection apparatus disclosed in Japanese Patent Application (Laid-Open) No. 07-152510, the priority order is allocated to each printer in due order from the printer located nearby a terminal apparatus, and the allocated priority order is managed as position information. Then, the printer which prints and outputs the data instructed to be output by the terminal apparatus on the basis of the priority order is determined, whereby the printer located nearby the terminal apparatus can be automatically selected and the printing output can be performed.

In a case where such a technique is applied to an image processing system which performs cluster copying with the plural image output devices, for example, when the priority order is allocated to each of the five image output devices in due order from the device located nearby the scanner, the two image output devices nearest to the scanner can be preferentially selected automatically and the printing output can be performed. Thus, the time for sheet collection after the copying ends can be reduced, whereby it is thought that the plural image output devices suitable for the operator's various output requests can be selected with simple operation.

Incidentally, when the cluster copying is performed in the image processing system, it is necessary to first specify the plural image output devices for performing the image output and then determine how to distribute the set number of copies of the original respectively to the plural image output devices. Conventionally, when the output copies are automatically distributed, the set number of copies of the original is uniformly distributed to the plural image output devices, or the set number of copies is distributed to each image output device on the basis of the output speed or the like of each device.

Further, as in the job management system disclosed in Japanese Patent Application Laid-Open No. 11-119945, one technique is proposed in which a cluster copying start number represents a previously set lower limit number of output copies which must be exceeded, or cluster copying is not performed. Thus, if the number of copies designated to a job is equal to or smaller than the cluster copying start number, a job which performs a process with one of plural printers is created, whereby unnecessary cluster copying is eliminated.

In the device selection, conventionally the plural image output devices can be automatically selected based on the priority order of their ability to comply with the operator's various requests. However, after the device selection, in a case where the number of copies is distributed to the plural image output devices specified as the output destinations, the number of copies based on the priority order is not performed. Thus, for example, it is assumed that the device selection is performed by giving priority to the setting place, and thus the local printer at the same place as the scanner and one remote printer nearest to the scanner are selected. Even in such a case, if the output speed of the remote printer is higher than that of the local printer, when distribution of the number of copies is based on the output speed in the next-step, a large number of copies is distributed to the remote printer. As a result, the time for sheet collection after the copying ends occasionally may not be reduced.

As described above, in the conventional image processing system, after the plural image output devices for performing the image outputting are specified, since distribution control of the number of copies based on the distribution priority order for the plural image output devices is not performed, the operator's various requests occasionally can not be complied with, whereby there is a lack of flexibility.

Further, in the case where the number of copies is distributed to the plural image output devices specified as the output destinations, the number of copies based on the lower limit information, a limitation value, or the like can be distributed. However, for example, in the case where the image output is based on the lower limit information by the single device to eliminate unnecessary cluster copying as in the abovementioned job management system, the image might be automatically output by a low-quality image output device though the operator hopes for the image to be output by the high-quality image output device. Namely, there is a problem of not obtaining an operator's desired output result in the conventional automatic distribution of the number of output copies based only on the limitation value.

SUMMARY OF THE INVENTION

The present invention is to solve the abovementioned problems, and an object thereof is to provide an image output control apparatus which can flexibly comply with operator's various requests by enabling, even after specifying the plural image output devices performing image output, distribution control of the number of copies for the plural image output devices on the basis of distribution priority order, an image output control method for such an image output control apparatus, and a storage medium.

As one means for achieving this object, the present invention provides an image output control apparatus which is connected to an input device inputting image data and plural image output devices through a communication medium, and can control image output of the plural image output devices. The apparatus comprises first setting means for setting the total number of output copies when the image data is output by the plural image output devices, first storage means for storing distribution priority order for distributing the total number of output copies set by the first setting means to the plural image output devices, and control means for performing control to distribute the total number of output copies to the respective image output devices outputting the image data, on the basis of the distribution priority order.

Another object of the present invention is to provide an image output control apparatus which can perform, after specifying plural image output devices performing image output, distribution control of the number of copies based on a limitation value according to the priority order of each image output device and thus can improve productivity of the image output while complying with an operator's various requests, an image output control method for such an image output control apparatus, and a storage medium.

As one means for achieving this object, the present invention provides an image output control apparatus which is connected to an input device inputting image data and plural image output devices through a communication medium, and which can control image output of the plural image output devices. The apparatus comprises first setting means for setting the total number of output copies when the image data is output by the plural image output devices, first storage means for storing distribution priority order for distributing the total number of output copies set by the first setting means to the plural image output devices, second storage means for storing a limitation value for limiting the number of distribution copies in the total number of output copies set by the first setting means, for each image output device, and control means for performing control to distribute the total number of output copies to the respective image output devices outputting the image data, on the basis of the distribution priority order and the limitation values.

Other objects and features of the present invention will become apparent from the following detailed description and the attached drawings.

BRIEF DESCRIPTION OF THE DRAWINGS

FIG. 7 is a block diagram for explaining the structure of an image compression unit shown in FIG. 2;

FIG. 8 is a block diagram for explaining the structure of an image rotation processing unit shown in FIG. 2;

FIG. 10 is a diagram for explaining an image rotation process by the image rotation unit shown in FIG. 8;

FIG. 14 is a diagram showing an example of a setting screen of distribution priority order and the number of copies distribution limitation value;

FIG. 15 is a diagram showing an example of a display screen of an operation unit when the distribution priority order and the limitation value are set;

FIG. 19 is a diagram showing an example of a distribution priority order setting screen on which distribution priority order of each image output device can be registered in one group;

FIG. 23 is a diagram for explaining a memory map of a storage medium which stores various data processing programs capable of being read and executed by the image processing system to which the input control apparatus of the present invention is applicable.

DETAILED DESCRIPTION OF THE PREFERRED EMBODIMENTS

Hereinafter, the embodiments of the present invention will be explained with reference to the attached drawings.

First Embodiment

Figure 1:
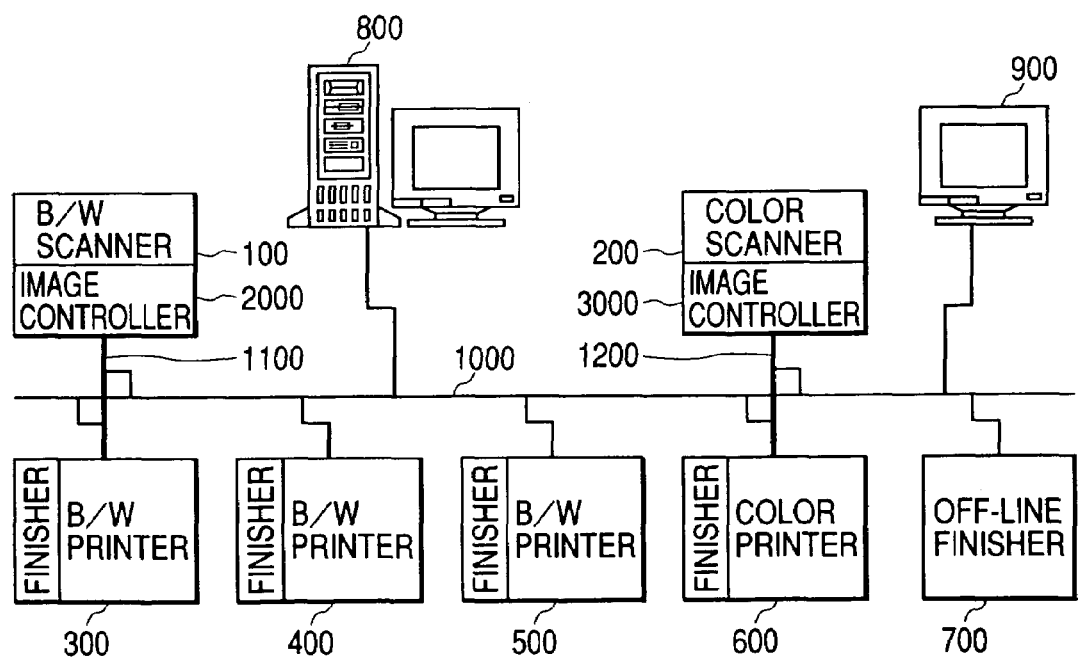
FIG. 1 is a block diagram for explaining the structure of an image processing system to which an image (output) control apparatus of the present invention is applicable.

FIG. 1 is a block diagram for explaining the structure of an image processing system to which an image output control apparatus of the present invention is applicable.

As shown in FIG. 1, the image processing system is composed of a B/W (black-and-white) scanner 100 which is an image input device and can read a B/W original, a color scanner 200 which is also the image input device and can read a color original, a low-speed (20 pages/minute) B/W printer 300 which is an image output device, a medium-speed (40 pages/minute) B/W printer 400 which is also the image output device, a high-speed (60 pages/minute) B/W printer 500 which is also the image output device, a color printer 600 which is also the image output device, an off-line finisher 700 which can perform an off-line postprocess for printing sheets, a server computer 800 which has a large storage capacity, a personal computer 900 for an individual, an Ethernet 1000 which is a transmission means in a known network structure, a local video bus 1100 which connects the scanner 100 to the printer 300, and a local video bus 1200 which connects the scanner 200 to the printer 600.

The scanners 100 and 200 being the image input devices are connected respectively to image controllers 2000 and 3000 which perform image reading control and image transfer control, through not-shown dedicated buses.

It should be noted that each of the image controllers 2000 and 3000 has the function as an image output control apparatus. Namely, when image data input by each of the scanners 100 and 200 is output to the plural image output devices, each of the image controllers 2000 and 3000 controls a distribution process for the set number of output copies, transmits together with the image data the set number of output copies to each image output device, and thus controls the image output of the image process system as a whole.

Further, each of the printers 300, 400, 500 and 600, which are all image output devices, is connected to an on-line finisher which can perform an on-line postprocess for the printing sheets.

Further, the scanners 100 and 200, the image controllers 2000 and 3000, the printers 300, 400, 500 and 600, the off-line finisher 700, the server computer 800 and the personal computer 900 are connected through the Ethernet 1000 so as to be able to mutually communicate with others.

Further, each image output device contains a CPU, a ROM, a RAM and the like (all not shown) and can notify each device connected through the Ethernet 1000 of its current state.

Further, the personal computer 900 can request image output by transferring a printing job to the printers 300 to 600.

Each of the scanners 100 and 200 has a later-described operation unit. An operator can set the number of output copies (the total number of copies output by each image output device), the distribution priority order, and the number of copies distribution limitation value in cluster copying of FIG. 12 (also later described).

It should be noted that the number of output copies, the distribution priority order, the limitation value and the like for the image controller 2000 or 3000 may be set from the personal computer 900 through the Ethernet 1000.

Hereinafter, the details of the devices will be explained by way of examples of the scanner 100 as the image input device and the printer 300 as the image output device. However, it should be noted that other image input devices, image control devices and image output devices have substantially the same structures.

Figure 2:
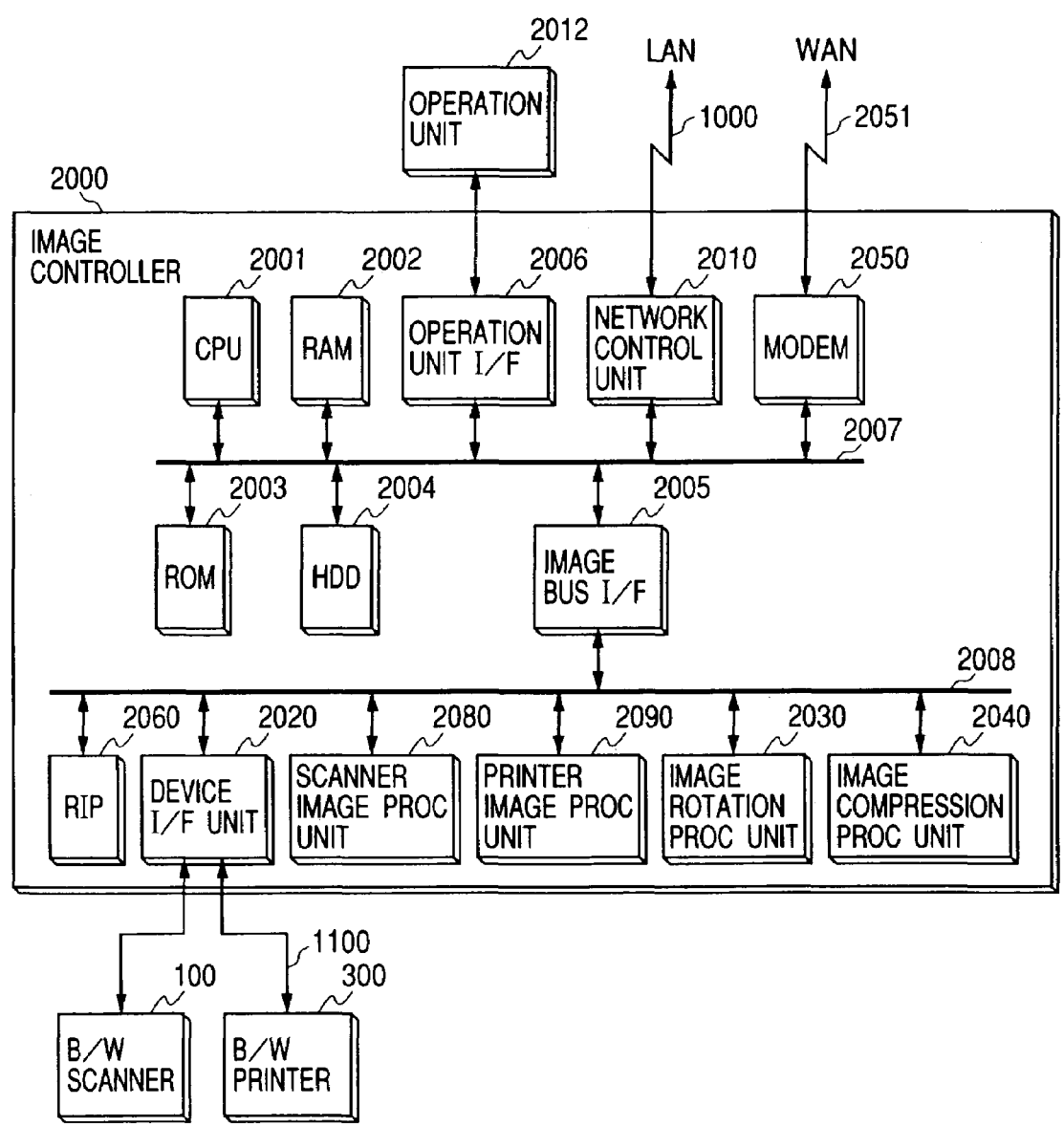
FIG. 2 is a block diagram for explaining the structure of the image control apparatus shown in FIG. 1.

FIG. 2 is a block diagram for explaining the structure of the image controller 2000 shown in FIG. 1. In FIG. 2, the same numerals as those in FIG. 1 are applied to the same parts as those in FIG. 1 respectively.

In FIG. 2, the image controller 2000 is connected to the scanner 100 being the image input device or the printer 300 being the image output device and, meanwhile to the LAN (or Ethernet) 1000 or a WAN (wide area network) 2051 (also called a public line 2051 hereinafter), and thus acts as the controller for inputting and outputting image information and device information.

In the image controller 2000, numeral 2001 denotes a CPU which controls the entire system on the basis of programs stored in a ROM 2003 or in another storage medium (not shown). Numeral 2002 denotes a RAM which acts as a system working memory used by the CPU 2001. The RAM 2002 also acts as the image memory for temporarily storing image data. The ROM 2003 is the boot ROM which stores a boot program of the system.

Numeral 2004 denotes an HDD (hard disk drive) which stores system software, image data and the like. Numeral 2006 denotes an operation unit I/F (interface) which interfaces with an operation unit 2012, outputs the image data to be displayed on the operation unit 2012 to this operation unit 2012, and transmits information input by a user of this system to the CPU 2001. The operation unit 2012 includes an LCD (liquid crystal display) on which the state of the device, setting information and the like are screen-displayed, and a touch panel on which the operator performs various input operations, setting input and the like. Also, as described later, the number of output copies, the distribution priority order, the limitation value and the like can be set at the operation unit 2012.

Figure 12:
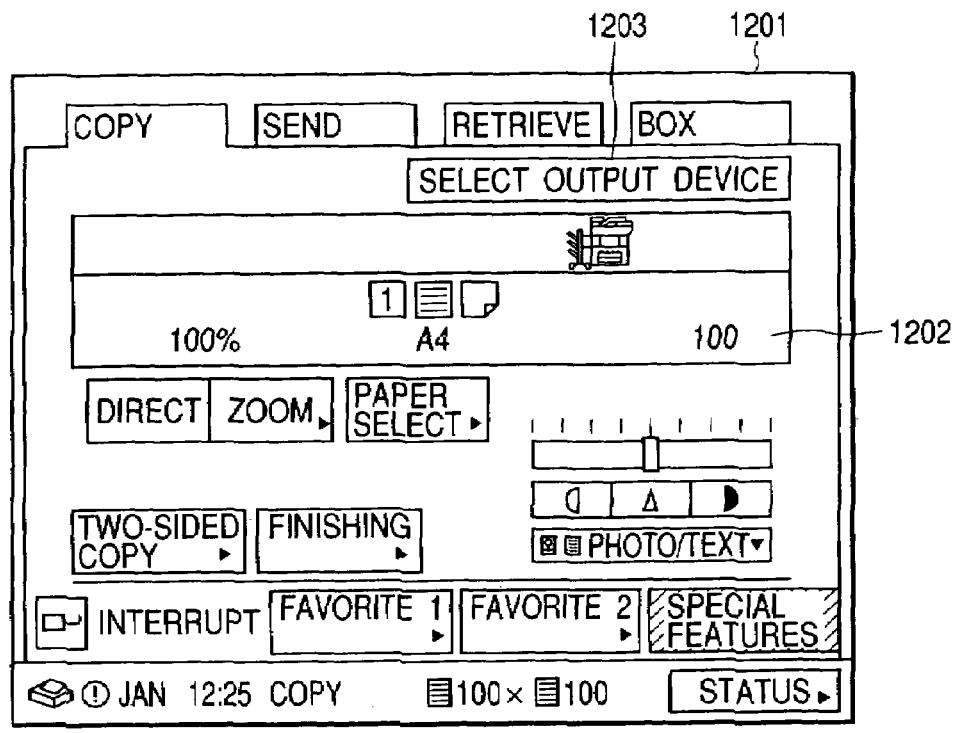
FIG. 12 is a diagram showing a setting screen on which the number of output copies in case of cluster copying is set.

It should be noted that the distribution priority order, the limitation value and the like shown in later-described FIG. 12 are stored in the HDD 2004 or in another storage medium (not shown).

Numeral 2010 denotes a network control unit which is connected to the LAN 1000 to input and output information. Incidentally, the information representing image output speed, setting positions and the like of the nodes connected to the network control unit 2010 is stored for each address in the HDD 2004. Numeral 2050 denotes a modem which is connected to the public line 2051 to input and output information. The above devices are arranged on a system bus 2007.

Numeral 2005 denotes an image bus I/F which is the bus bridge for connecting the system bus 2007 to an image bus 2008 transferring image data at high speed and converting a data structure. The image bus 2008 is structured by a high-speed bus such as a PCI (peripheral component interface) bus or the like.

Incidentally, the following devices are arranged on the image bus 2008.

Numeral 2060 denotes an RIP (raster image processor) which expands a PDL (page description language) code into an bit map image. Numeral 2020 denotes a device I/F unit which connects the scanner 100 being the image input device and the printer 300 being the image output device to the image controller 2000 and performs synchronous system/asynchronous system conversion of image data.

Numeral 2080 denotes a scanner image processing unit which performs correction, process and editing to input image data. Numeral 2090 denotes a printer image processing unit which performs printer correction, resolution conversion and the like to printing output image data. Numeral 2030 denotes an image rotation processing unit which performs rotation of image data. Numeral 2040 denotes an image compression processing unit which performs an image compression/decompression process to multivalue image data in a JPEG (Joint Photographic Experts Group) system and performs an image compression/decompression process to binary image data in a JBIG (Joint Bi-level Image Experts Group) system, an MMR (modified modified READ (relative element address)) system or an MH (modified Huffman) system.

The CPU 2001 can detect error information of the printer 300 through the local video bus 1100 (e.g., detecting the error information by inquiring of the printer 300 as to its state). Also, the CPU 2001 can detect error states of the printers 400 to 600 through the network control unit 2010 (e.g., detecting the error information by inquiring of the printers 400 to 600 as to their states).

Figure 3:
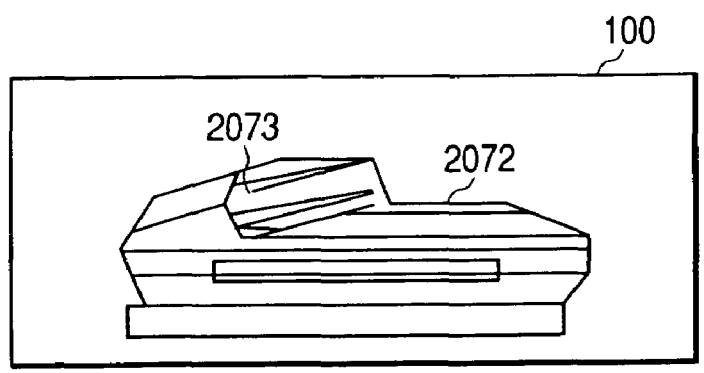
FIG. 3 is a sectional diagram for explaining the structure of an image input device (or a scanner) shown in FIG. 1.

FIG. 3 is a sectional diagram for explaining the structure of the image input device (the scanner 100) shown in FIG. 1. In FIG. 3, the same numerals as those in FIG. 1 are applied to the same parts as those in FIG. 1 respectively.

The scanner 100 being the image input device illuminates an image on an original sheet, scans it with a CCD line sensor (not shown), and converts the scanned image into an electrical signal as raster image data.

Numeral 2072 denotes an original feeder which feeds the original sheets set on a tray 2073 one-by-one, and performs a reading operation of the original image.

Hereinafter, the original image reading operation will be explained.

When a user (an operator) sets original sheets on the tray 2073 of the original feeder 2072 and instructs the system to start reading original images from the operation unit 2012 shown in FIG. 2, an instruction is given to the scanner 100 by the CPU 2001, the original sheets are fed one-by-one by the original feeder 2072, and the original image is read.

Figure 4:
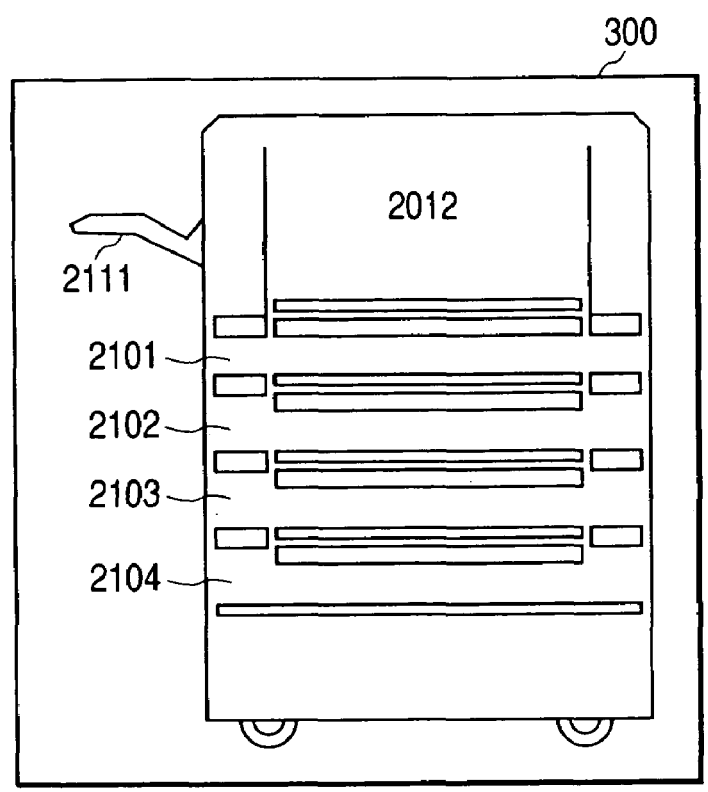
FIG. 4 is a sectional diagram for explaining the structure of an image output device (or a printer) shown in FIG. 1.

FIG. 4 is a sectional diagram for explaining the structure of the image output device (the printer 300) shown in FIG. 1. In FIG. 4, the same numerals as those in FIG. 1 are applied to the same parts as those in FIG. 1 respectively.

The printer 300 being the image output device converts raster image data into an image on a sheet. As systems for performing such conversion, there are an electrophotographic system using a photosensitive drum and a photosensitive belt, an inkjet system for directly printing an image on a sheet by emitting ink from a micronozzle array, a sublimation system, a thermal transfer system and the like, and the printer 300 may apply any system.

Numerals 2101, 2102, 2103 and 2104 denote sheet cassettes in which different-sized or different-direction sheets are stored. In order to be able to select different sheet sizes or different sheet directions, the printer 300 includes plural sheet feed stages to which the corresponding sheet cassettes 2102 to 2104 are set. Numeral 2111 denotes a sheet discharge tray which receives the sheets after the printing.

Hereinafter, a printing operation will be explained.

The printing operation is started in response to an instruction from the CPU 2001 shown in FIG. 2, printing is performed onto the sheet fed from any of the sheet cassettes 2101 to 2104, and the sheet subjected to the printing is discharged to the sheet discharge tray 2111.

Figure 5:
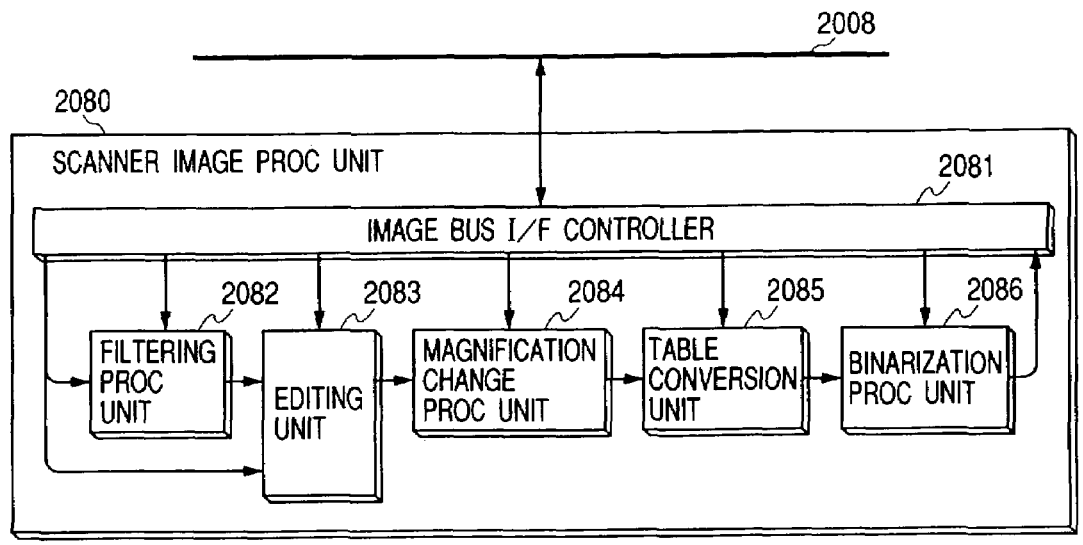
FIG. 5 is a block diagram for explaining the structure of a scanner image processing unit shown in FIG. 2.

FIG. 5 is a block diagram for explaining the structure of the scanner image processing unit 2080 shown in FIG. 2. In FIG. 5, the same numerals as those in FIG. 2 are applied to the same parts as those in FIG. 2 respectively.

In the drawing, numeral 2081 denotes an image bus I/F controller which is connected to the image bus 2008 to control its bus access sequence. Further, the image bus I/F controller 2081 controls each unit in the scanner image processing unit 2080 and generates timing signals.

Numeral 2082 denotes a filtering processing unit which performs convolution calculation with a spatial filter. Numeral 2083 denotes an editing unit which recognizes, e.g., a closed area surrounded by pen marking from the input image data and performs image processes such as shadowing, screening, negative/positive reversing and the like to the image data within the closed area.

Numeral 2084 denotes a magnification change processing unit. When the resolution of the read image is intended to be changed, the magnification change processing unit 2084 performs interpolation calculation in the main scan direction of a raster image to perform image enlargement/reduction. In the sub scan direction, the image enlargement/reduction is performed by changing the scan speed of an image reading line sensor (not shown).

Numeral 2085 denotes a table conversion unit which performs table conversion to convert the read image data being brightness data into density data. Numeral 2086 denotes a binarization processing unit which binarizes multivalue gray scale image data by an error diffusion process or a screen process. The image data subjected to the binarization process by the binarization processing unit 2086 is transferred to the image bus 2008 through the image bus I/F controller 2081.

Figure 6:
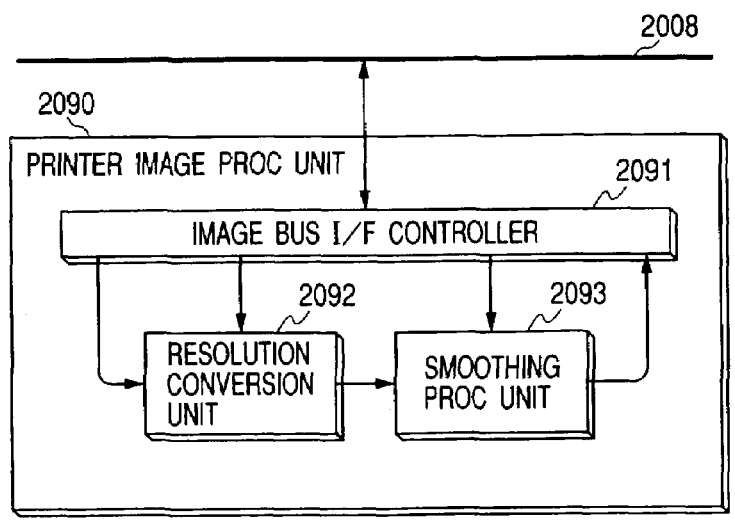
FIG. 6 is a block diagram for explaining the structure of a printer image processing unit shown in FIG. 2.

FIG. 6 is a block diagram for explaining the structure of the printer image processing unit 2090 shown in FIG. 2. In FIG. 6, the same numerals as those in FIG. 2 are applied to the same parts as those in FIG. 2 respectively.

In the drawing, numeral 2091 denotes an image bus I/F controller which is connected to the image bus 2008 to control its bus access sequence. Further, the image bus I/F controller 2091 controls each unit in the printer image processing unit 2090 and generates timing signals.

Numeral 2092 denotes a resolution conversion unit which performs resolution conversion to convert the resolution of the image data transmitted from the LAN 1000 or the public line 2051 into the resolution of the printer 300. Numeral 2093 denotes a smoothing processing unit which performs a process to smooth jaggy (i.e., unevenness appearing on the B/W boundary part) of the image data after the resolution conversion.

FIG. 7 is a block diagram for explaining the structure of the image compression unit 2040 shown in FIG. 2. In FIG. 7, the same numerals as those in FIG. 2 are applied to the same parts as those in FIG. 2 respectively.

In the drawing, numeral 2041 denotes an image bus I/F controller which is connected to the image bus 2008 to control its bus access sequence. Further, the image bus I/F controller 2041 performs timing control to exchange data to/from an input buffer 2042 and an output buffer 2045, and mode setting for an image compression unit 2043.

Hereinafter, an image compression process will be explained.

The setting for image compression control is performed from the CPU 2001 to the image bus I/F controller 2041 through the image bus 2008. By this setting, the image bus I/F controller 2041 performs a necessary setting for the image compression (e.g., setting of MMR compression, setting of JBIG expansion, etc.) to the image compression unit 2043. After the necessary setting is performed, image data transfer permission is issued from the CPU 2001 to the image bus I/F controller 2041.

According to this permission, the image data transfer is started from the RAM 2002 or each device on the image bus 2008 by the image bus I/F controller 2041. The received image data is temporarily stored in the input buffer 2042 and then transferred at certain speed in response to an image data request of the image compression unit 2043.

At this time, it is judged by the input buffer 2042 whether or not the image data can be transferred between the image bus I/F controller 2041 and the image compression unit 2043. If image data reading from the image bus 2008 and image data writing to the image compression unit 2043 are impossible, data transfer is controlled not to be performed (such control is called "handshaking" hereinafter).

The received image data is temporarily stored in a RAM 2044 by the image compression unit 2043. This is because, in case of the image compression, the data of several lines is necessary according to a kind of the image compression process to be performed. Namely, the image compression of first one line can not be performed if the image data of several lines is not prepared.

The image data subjected to the image compression is immediately transferred to the output buffer 2045. In the output buffer 2045, the handshaking for the image bus I/F controller 2041 and the image compression unit 2043 is performed, and the image data is transferred to the image bus I/F controller 2041. By the image bus I/F controller 2041, the compressed (or decompressed) image data transferred is further transferred to the RAM 2002 or each device on the image bus 2008.

Such a series of processes is repeated until a processing request is no longer issued by the CPU 2001 (i.e., until the process of the necessary number of pages ends) or a stop request is issued by the image compression unit 2043 (i.e., until an error occurs in the compression or decompression).

FIG. 8 is a block diagram for explaining the structure of the image rotation processing unit 2030 shown in FIG. 2. In FIG. 8, the same numerals as those in FIG. 2 are applied to the same parts as those in FIG. 2 respectively.

In the drawing, numeral 2031 denotes an image bus I/F controller which is connected to the image bus 2008 to control its bus access sequence. Further, the image bus I/F controller 2031 performs control to set a mode or the like for an image rotation unit 2032 and timing control to transfer image data to the image rotation unit 2032.

Hereinafter, an image rotation process will be explained.

The setting for image rotation control is performed from the CPU 2001 to the image bus I/F controller 2031 through the image bus 2008. By this setting, the image bus I/F controller 2031 performs necessary setting for the image rotation (e.g., setting of image size, rotation direction, rotation angle, etc.) to the image rotation unit 2032. After the necessary setting is performed, image data transfer permission is issued from the CPU 2001 to the image bus I/F controller 2031.

According to this permission, the image data transfer is started from the RAM 2002 or each device on the image bus 2008 by the image bus I/F controller 2031. Here, it is assumed that the image data transfer size from the RAM 2002 or each device on the image bus 2008 by the image bus I/F controller 2031 is 32 bits and the image size to be rotated is 32×32 bits. Further, it is assumed that the image transfer is performed in every 32 bits (i.e., in the unit of 32 bits) when the image data is actually transferred to the image bus 2008 (binary image is assumed to be managed).

As described above, in order to obtain the image of 32×32 bits, it is necessary to perform the above 32-bit unit data transfer 32 times, and it is further necessary to transfer image data from uncontinuous addresses (see later-described FIG. 9).

The image data transferred from the uncontinuous addresses is written in a RAM 2033 such that the image data is rotated by a desired angle in case of reading the image. For example, in case of counterclockwise rotating the image by 90°, the 32-bit image data first transferred is written in the Y direction as shown in later-described FIG. 10. Then, when the written data is read, the image is rotated by reading the data in the X direction of FIG. 10.

After the image rotation of 32×32 bits (i.e., data writing in the RAM 2033) ends, the image data is read from the RAM 2033 by the image rotation unit 2032 in the above reading method, and the read image data is transferred to the image bus I/F controller 2031.

The image bus I/F controller 2031 which received the rotation-processed image data performs continuous addressing to transfer the data to the RAM 2002 or each device on the image bus 2008.

Such a series of processes is repeated until a processing request is no longer issued by the CPU 2001 (i.e., until the process of the necessary number of pages ends).

Figure 9:
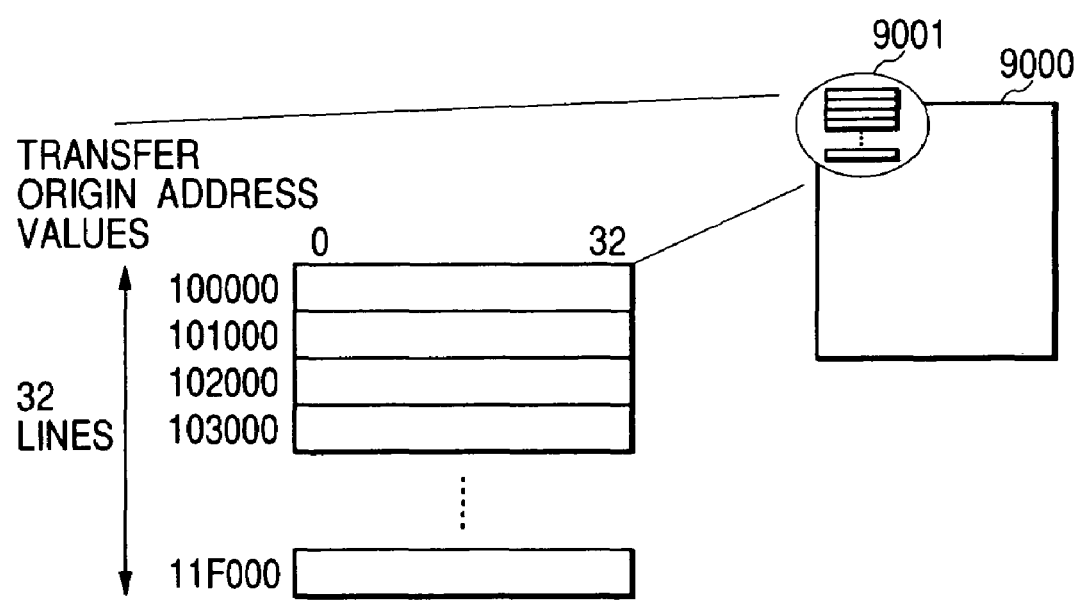
FIG. 9 is a diagram for explaining image data transfer from discontinuous addresses by an image bus I/F (interface) controller shown in FIG. 8.

FIG. 9 is a diagram for explaining the image data transfer from the uncontinuous addresses by the image bus I/F controller 2031 shown in FIG. 8.

In the drawing, numeral 9000 denotes a transfer-origin memory, and numeral 9001 denotes image data of 32×32 bits in the memory 9000.

As shown in FIG. 9, in order to obtain the image of 32×32 bits, the 32-bit unit data transfer is performed 32 times. For example, 32-bit data transfer from a transfer-origin address value "100000h (h indicates hexadecimal number)" (i.e., 32-bit data transfer toward the X direction) is performed, 32-bit data transfer from a transfer-origin address value "101000h" is performed, 32-bit data transfer from a transfer-origin address value "102000h" is performed, 32-bit data transfer from a transfer-origin address value "103000h" is performed, . . . , and finally 32-bit data transfer from a transfer-origin address value "11F000h" is performed.

FIG. 10 is a diagram for explaining the image rotation process by the image rotation unit 2032 shown in FIG. 8.

As shown in FIG. 10, the image data transferred from the uncontinuous addresses is written in the RAM 2033 such that the image data is rotated by a desired angle in case of reading the image. For example, in case of counterclockwise rotating the image by 90°, the 32-bit image data first transferred is written in the Y direction. Then, the 32-bit image data transferred next is written at the address greater by "1" than the address at which the first-transferred image data is written in the Y direction. Thereafter, this operation is repeated. After the image data transfer completely ends, when the written data is read, the image is rotated by reading the data in the X direction.

Figure 11:
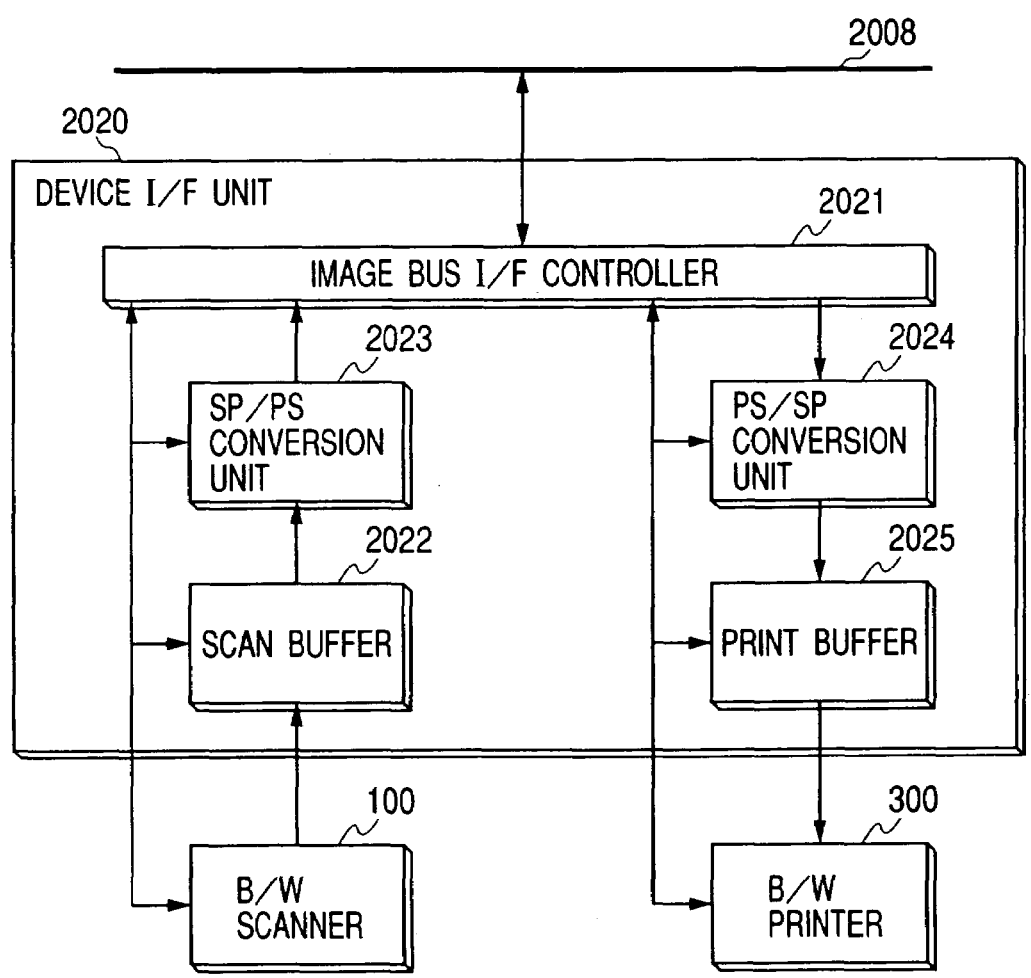
FIG. 11 is a block diagram for explaining the structure of a device I/F unit shown in FIG. 2.

FIG. 11 is a block diagram for explaining the structure of the device I/F unit 2020 shown in FIG. 2. In FIG. 11, the same numerals as those in FIG. 2 are applied to the same parts as those in FIG. 2 respectively.

In the drawing, numeral 2021 denotes an image bus I/F controller which is connected to the image bus 2008 to control its bus access sequence. Further, the image bus I/F controller 2021 controls each unit in the device I/F unit 2020 and generates timing signals, and also generates a control signal to the external scanner 100 and the printer 300.

Numeral 2022 denotes a scan buffer which temporarily stores the image data transferred from the scanner 100 and outputs image data in synchronism with the image bus 2008. Numeral 2023 denotes an SP/PS (serial-to-parallel/parallel-to-serial) conversion unit which sorts (arranges) in due order or resolves (decomposes) the image data stored in the scan buffer 2022 so as to convert its data width into the data width of the image data capable of being transferred to the image bus 2008. Numeral 2024 denotes a PS/SP (parallel-to-serial/serial-to-parallel) conversion unit which resolves (decomposes) or sorts (arranges) in due order the image data transferred from the image bus 2008 so as to convert its data width into the data width of the image data capable of being stored in a print buffer 2025.

The print buffer 2025 temporarily stores the image data transferred from the image bus 2008 and outputs image data in synchronism with the printer 300.

Hereinafter, a processing procedure in the image scan will be explained.

The image data transferred from the scanner 100 is stored in the scan buffer 2022 in synchronism with a timing signal also transferred from the scanner 100. In a case where the image bus 2008 is the PCI bus, when the image data corresponding to 32 bits or more are entered in the buffer, the image data corresponding to 32 bits are transferred from the buffer to the SP/PS conversion unit 2023 in a first-in/first-out manner to convert them into 32-bit image data. Then, the obtained 32-bit image data is transferred to the image bus 2008 through the image bus I/F controller 2021.

In a case where the image bus 2008 is an IEEE1394 (Institute of Electrical and Electronic Engineers Standard 1394) bus, the image data in the buffer is transferred from the buffer to the SP/PS conversion unit 2023 in a first-in/first-out manner to convert it into serial image data. Then, the obtained serial image data is transferred to the image bus 2008 through the image bus I/F controller 2021.

Hereinafter, a processing procedure in the image printing will be explained.

In the case where the image bus 2008 is the PCI bus, the image data corresponding to 32 bits transferred from the image bus 2008 and received by the image bus I/F controller 2021 are transferred to the PS/SP conversion unit 2024 and resolved (or decomposed) into the image data having the bit number corresponding to that of the input data of the printer 300. Then, the obtained image data is stored in the print buffer 2025.

In the case where the image bus 2008 is the IEEE1394 bus, the serial image data transferred from the image bus 2008 and received by the image bus I/F controller 2021 are transferred to the PS/SP conversion unit 2024 and converted into the image data having the bit number corresponding to that of the input data of the printer 300. Then, the obtained image data is stored in the print buffer 2025.

Then, the image data in the buffer is transferred to the printer 300 in a first-in/first-out manner in synchronism with a timing signal transferred from the printer 300.

Next, the cluster copying in the image processing system according to the present embodiment will be explained. As described above, the image controller 2000 is connected to the scanner 100 and the printer 300 through the local video bus 1100 and is also connected to other plural printers through the Ethernet 1000.

Therefore, the image controller 2000 can transfer the image data input by the original reading of the scanner 100 not only to the printer 300 but also to the plural printers including other printers for image output. A cluster copying mode is the operation mode of the image processing system that, when the original copying of the plural number of copies is performed, the set number of output copies is distributed to the plural image output devices, and the copying is performed dispersively.

A procedure until the cluster copying starts will be explained. First, the original is set on the tray 2073, and the number of output copies of the set original is determined and set at the operation unit 2012. FIG. 12 shows an example of a setting screen 1201 which is displayed on the LCD of the operation unit 2012 at this time. It is displayed at a set number of copies display position 1202 that "100" copies has been set.

Figure 13:
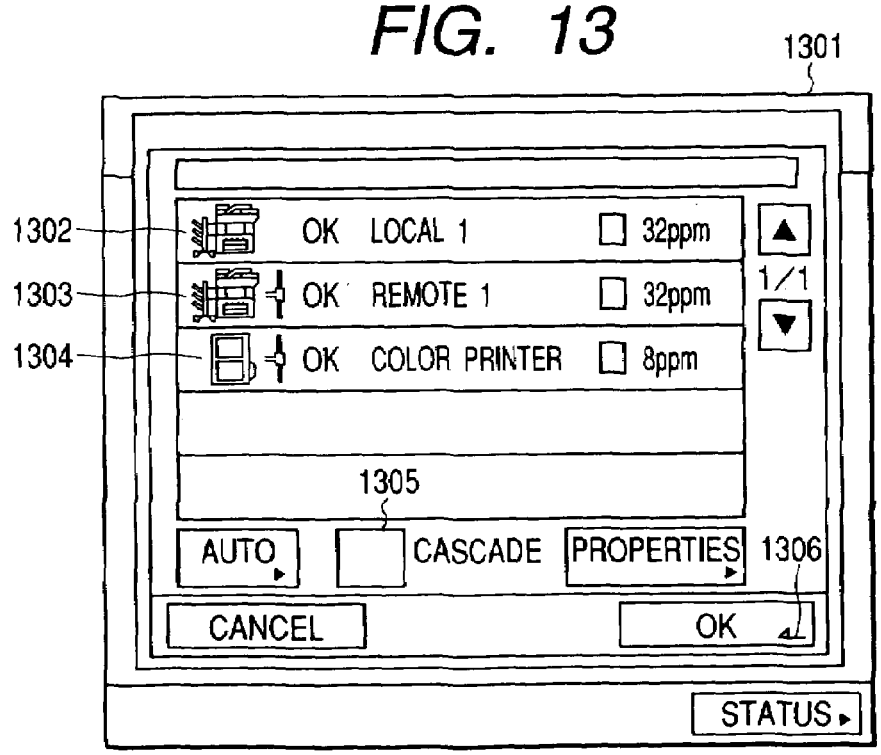
FIG. 13 is a diagram showing a selection screen on which plural image output devices performing image output in case of the cluster copying is selected.

Next, when an output device selection button 1203 on the setting screen 1201 is depressed, the plural printers that are to perform image output are selected. FIG. 13 shows an example of a setting screen 1301 at this time. When a cascade button 1305 is depressed, the cluster copying mode is selected, and, e.g., displayed printers 1302 and 1303 are selected. Then, when an OK button 1306 is depressed, it is set that the cluster copying of 100 copies is performed by the printers 1302 and 1303.

After the number of output copies is set and the image output devices are selected, it is necessary to distribute the set number of output copies (called the set number of copies hereinafter) into the plural selected image output devices. Hereinafter, an automatic distribution process in the cluster copying based on the distribution priority order and the limitation value according to the present embodiment will be explained.

The present embodiment is directed to an example in which the set number of copies is distributed when the operation unit 2012 instructs that the image read by the scanner 100 be output to the printer 300 (called a printer 1) and the printer 400 (called a printer 2). Here, it is assumed that a start key (not shown) for starting the reading operation is provided on the operation unit 2012.

FIG. 14 is a diagram showing an example of the distribution priority order and the limitation value. Here, it is assumed that the content of the example has been stored in the HDD 2004.

FIG. 14 shows a case where the distribution priority order "1" and the limitation value "15" are set for the printer 1, and the distribution priority order "2" and the limitation value "20" are set for the printer 2.

It should be noted that the distribution priority order and the limitation value for each printer can be set from the operation units of the scanners 100 and 200, the personal computer 900 and the like to the image controllers 2000 and 3000 respectively.

FIG. 15 is a diagram showing an example of a setting screen on the LCD of the operation unit 2012 when the distribution priority order and the limitation value are set.

On a setting screen 1501, there is a place where a printer name 1503 is input at the right of a priority order 1502. The operator inputs the printer name from the top of the space 1503 in the order that he wants to raise the priority order, whereby the priority order is determined. After determining the priority order for each printer, a limitation value 1504 is input for each printer and an OK button 1505 is depressed, whereby the set distribution priority order and limitation value are stored in the HDD 2004.

Figure 16:
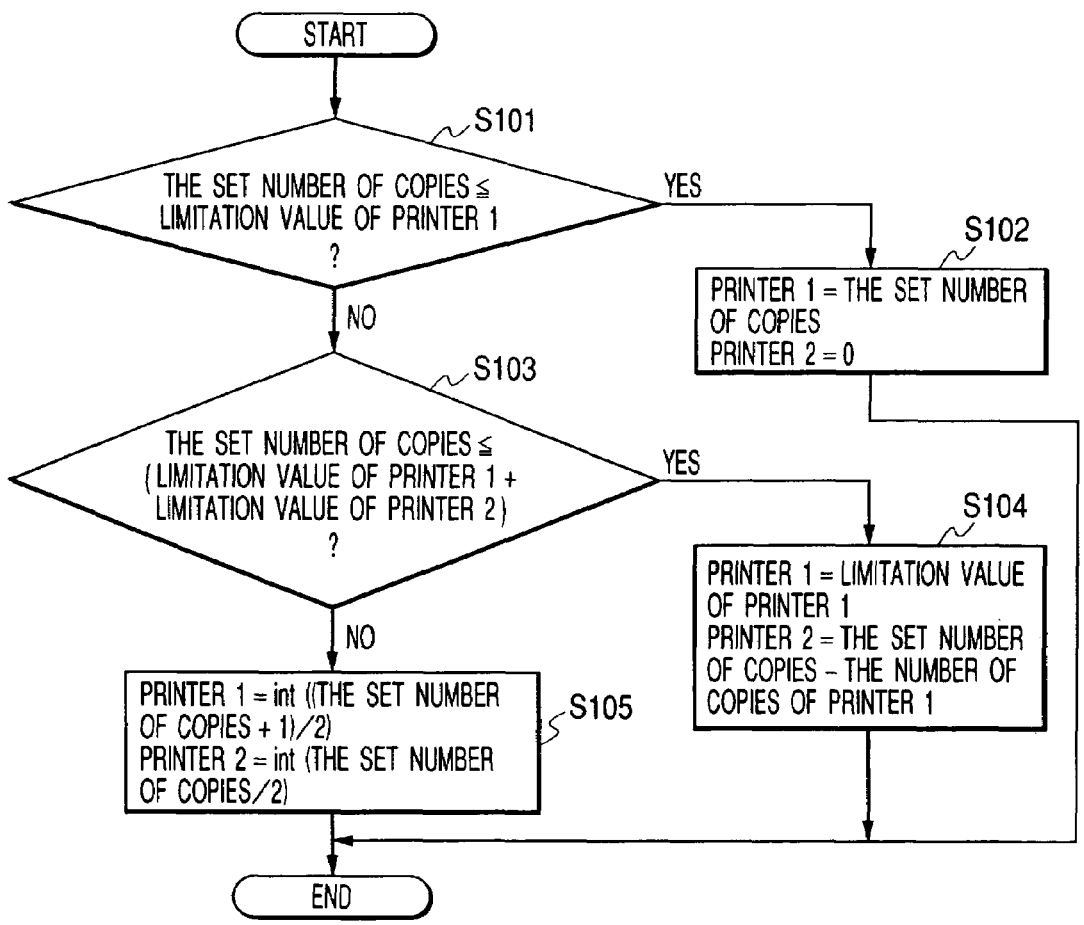
FIG. 16 is a flow chart showing an example of a processing procedure of the image processing system in the first embodiment.

FIG. 16 is a flow chart showing an example of the procedure of the automatic distribution process in the image processing system according to the present embodiment. It is assumed that the procedure is performed by the CPU 2001 of FIG. 2 on the basis of a program stored in the ROM 2003, the HDD 2004 or another storage medium (not shown). Further, symbols S101 to S105 show respective steps.

First, in the step S101, the set number of copies is compared with the limitation value of the printer 1. If it is judged that the set number of copies is not larger than (i.e., it is smaller than or equal to) the limitation value of the printer 1, the set number of copies is entirely output by the printer 1 in the step S102. Namely, the number of copies to be distributed to the printer 1 is set to the set number of copies, while the number of copies to be distributed to the printer 2 is set to "0".

On the other hand, if it is judged in the step S101 that the set number of copies is larger than the limitation value of the printer 1, in the step S103 the set number of copies is compared with the sum of the limitation values of the respective printers (i.e., the limitation value of the printer 1+the limitation value of the printer 2). If it is judged that the set number of copies is not larger than (i.e., it is smaller than or equal to) the sum of the limitation values of the respective printers (i.e., the limitation value of the printer 1+the limitation value of the printer 2), in the step S104 the number of copies to be distributed to the printer 1 is set to the limitation value of the printer 1, while the number of copies to be distributed to the printer 2 is set to the remaining number of copies (i.e., the set number of copies−the number of output copies of the printer 1).

Conversely, if it is judged in the step S103 that the set number of copies is larger than the sum of the limitation values of the respective printers (i.e., the limitation value of the printer 1+the limitation value of the printer 2), a process of equally distributing the number of copies to the printers 1 and 2 is performed in the step S105. Namely, the number of copies to be distributed to the printer 1 is set to a maximum integer not exceeding (the set number of copies+1)/2, while the number of copies to be distributed to the printer 2 is set to a maximum integer not exceeding (the set number of copies)/2.

For example, if the set number of copies is "10", in the step S102, the number of copies to be distributed to the printer 1 is set to "10", while the number of copies to be distributed to the printer 2 is set to "0".

Further, if the set number of copies is "20", in the step S104, the number of copies to be distributed to the printer 1 is set to "15", while the number of copies to be distributed to the printer 2 is set to "5".

Further, if the set number of copies is "50", in the step S105, the number of copies to be distributed to the printer 1 is set to "25", and the number of copies to be distributed to the printer 2 is also set to "25".

As described above, the set number of copies is preferentially distributed to the printer of which distribution priority order is high.

After the number of copies distribution process ends, the image data read by the image input device (scanner) 100 and the number of output copies determined in this process are transmitted together with an output command to each image output device, and the output process is then performed in each output device.

Although the present embodiment was explained with the two image output devices, it is clear that the present embodiment is also applicable to three or more image output devices in the same manner as above.

As described above, according to the present embodiment, the set number of copies distribution process is performed to the plural image output devices selected for the cluster copying, on the basis of the previously set distribution priority order and distribution limitation value. Thus, for example, if one original is copied to produce two copies, useless distribution that one original is automatically output to two printers can be evaded.

Further, the set number of copies is preferentially distributed to the image output device having the highest distribution priority order, on the basis of the limitation value of this device. Thus, the image output complying with operator's various requests can be performed.

Second Embodiment

In the first embodiment, the case where, when the set number of copies is larger than the sum of the limitation values of the respective printers, the process of equally distributing the number of copies to each of the plural printers is performed was explained. However, when the set number of copies is larger than the sum of the limitation values of the respective printers, the number of copies distribution may be weighted by the number of copies distribution limitation value of each printer.

Hereinafter, the process according to the present embodiment for automatically distributing the number of copies of the read image to each of the image output devices (printers) will be explained. This process is also called an automatic number of copies distribution control process of the cluster copying using the number of copies distribution limitation value.

Figure 17:
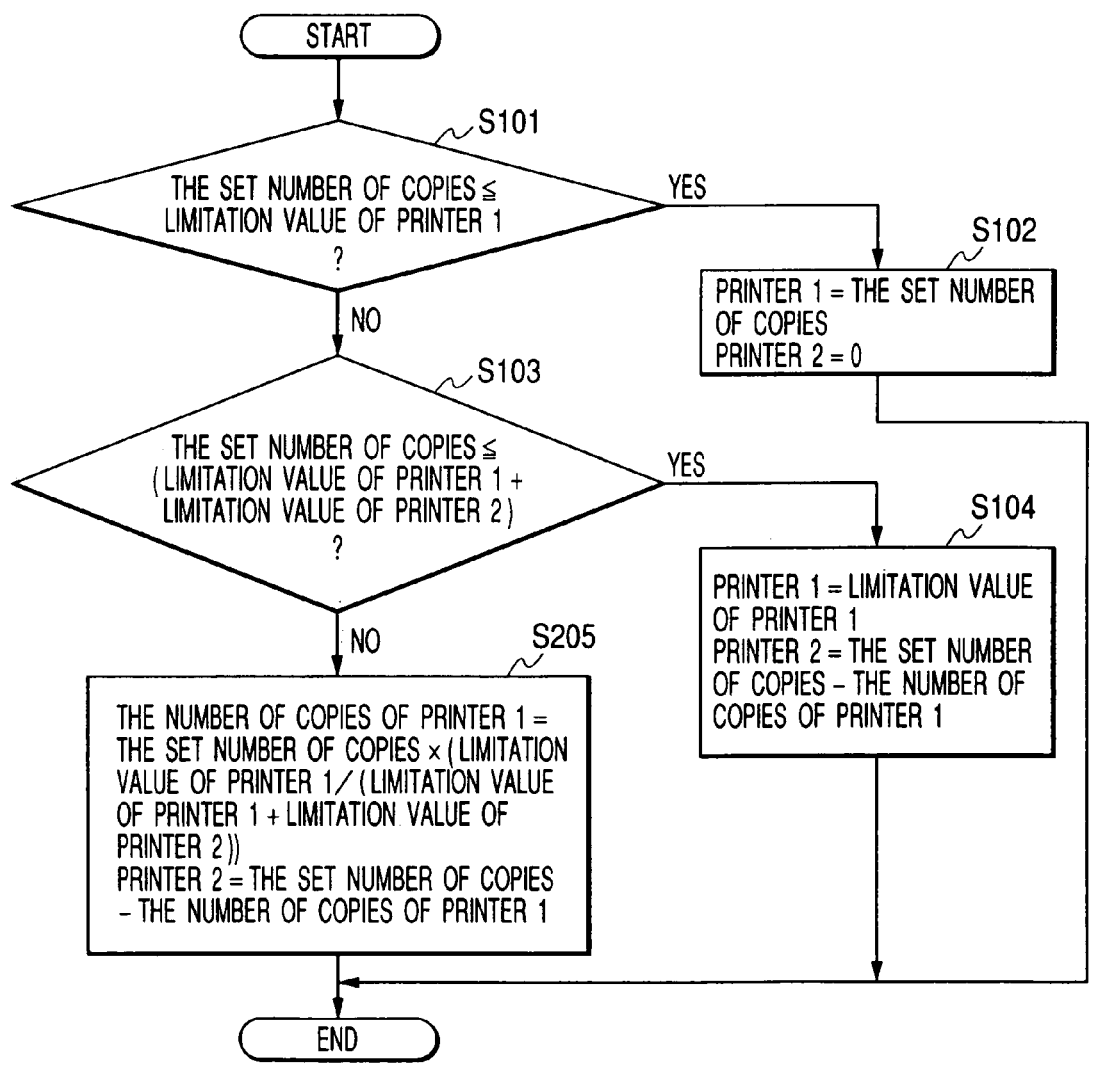
FIG. 17 is a flow chart showing an example of a processing procedure of the image processing system in the second embodiment.

FIG. 17 is a flow chart showing an example of an automatic distribution processing procedure of the image processing system according to the present embodiment. It is assumed that such a procedure is performed by the CPU 2001 of FIG. 2 on the basis of a program stored in the ROM 2003, the HDD 2004 or another storage medium (not shown). Further, symbols S101 to S104 and S205 show respective steps, and the same step numbers are applied respectively to the same steps as those in FIG. 16.

Since the processes in the steps S101 to S104 are the same as those in the steps S101 to S104 in FIG. 16 shown in the first embodiment, the explanation thereof will be omitted.

If judged in the step S103 that the set number of copies is larger than the sum of the limitation values of the respective printers (i.e., the limitation value of the printer 1+the limitation value of the printer 2), the number of copies distribution weighted by the limitation values of the respective printers is performed in the step S205. Namely, the number of copies to be distributed to the printer 1 is set to {the set number of copies×(the limitation value of the printer 1/(the limitation value of the printer 1+the limitation value of the printer 2))}, while the number of copies to be distributed to the printer 2 is set to (the set number of copies−the number of copies to be distributed to the printer 1).

Thus, in the step S205, since the distribution based on the limitation value can be performed, if the limitation value is determined beforehand according to performance and use frequency of each device, the copying process can be performed in a short time as compared with the distribution process in the first embodiment.

For example, if the set number of copies is "50", in the step S205, the number of copies to be distributed to the printer 1 is set to "211", and the number of copies to be distributed to the printer 2 is set to "29".

After the number of copies distribution process ends, the image data read by the image input device (scanner) 100 and the number of output copies determined in this process are transmitted together with an output command to each image output device, and the output process is then performed in each output device.

Although the present embodiment was explained with the two image output devices, it is clear that the present embodiment is also applicable to three or more image output devices in the same manner as above.

As described above, according to the present embodiment, since the limitation value is set in consideration of the performance and use frequency of the printer, the copying process for the plural copies can be ended in a short time even if the set number of distribution based on the distribution priority order is not performed resultingly.

Third Embodiment

When the cluster copying is performed by the image processing system to which the present invention is applied, an operator can set the distribution priority order and perform the number of copies distribution process on the basis of various output requests. Concretely, in the present embodiment, the number of copies distribution process which corresponds to the output request based on a setting position of each device will be explained in detail.

Figure 18:
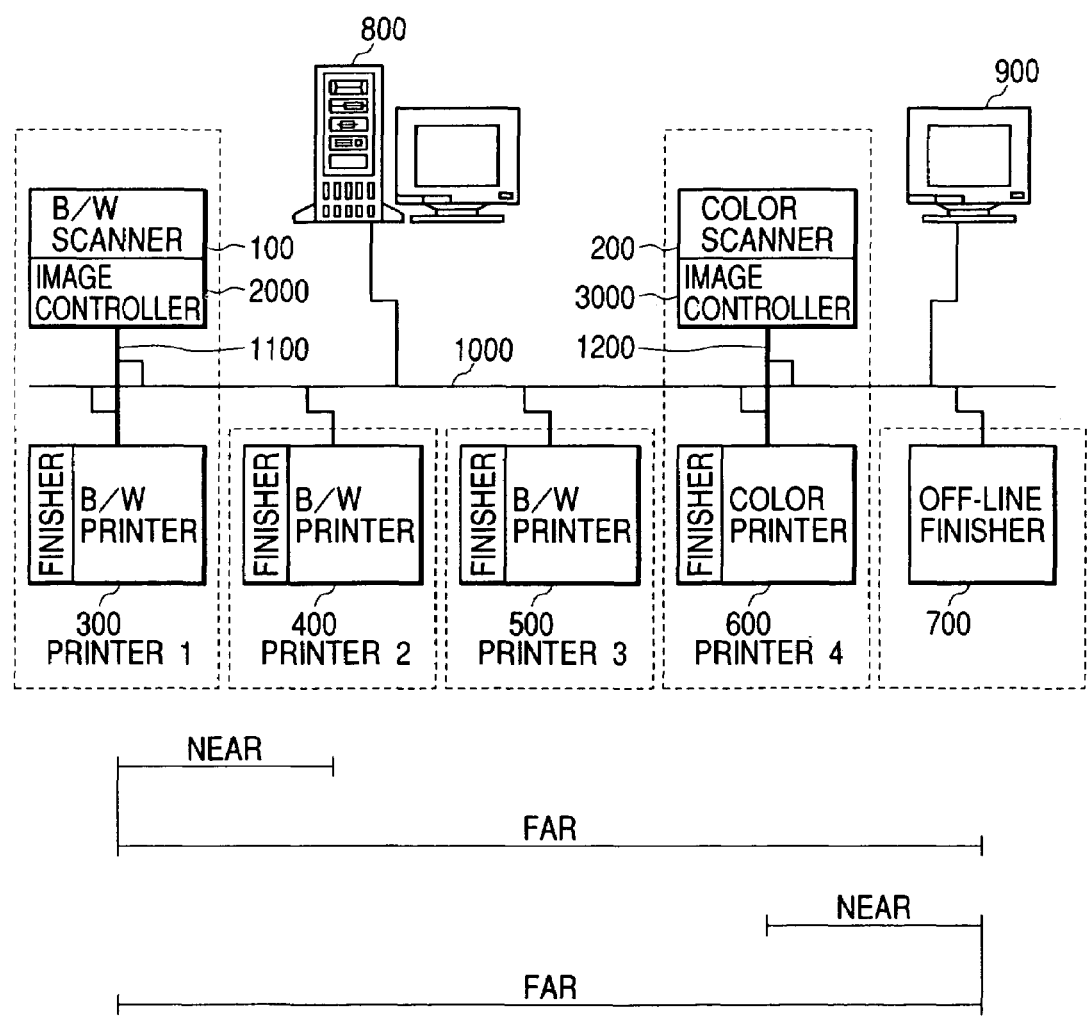
FIG. 18 is a block diagram for explaining interrelation of setting places of respective devices in the image processing system of the third embodiment.

FIG. 18 shows the image processing system according to the present embodiment. Although the structure of the image processing system in the present embodiment is substantially the same as those in the first and second embodiments shown in FIG. 1, the setting positions of the devices in the system are respectively specified in the present embodiment.

Namely, the scanner 100, the image controller 2000 and the B/W printer 300 (called a printer 1) are located at the same position. Based on this position, the printer 1, the B/W printer 400 (called a printer 2), the B/W printer 500 (called a printer 3), the color printer 600 (called a printer 4), and the off-line finisher 700 are linearly located from the left in this order.

For example, if the position where the B/W scanner 100 is located is assumed to be the base position, the printer 1 is the printer at the nearest position, and the printer 4 is the printer at the furthest position. Conversely, if the position where the off-line finisher 700 is located is assumed to be the base position, the printer 4 is the printer at the nearest position, and the printer 1 is the printer at the furthest position.

Therefore, when the original is set on the scanner 100 and the copying of the read original is performed by any one of the plural image output devices, the time for sheet collection after the image output can be the least when the copying is performed by using the printer 1. Conversely, it takes a lot of time for sheet collection when the copying is performed by using the printer 4.

Further, after the original was set on the scanner 100 and the copying of the read original was performed by any one of the plural image output devices, in order to carry the output sheets to the position of the off-line finisher 700 for a finishing operation, the time for carrying the output sheets to the finisher 700 can be the least when the copying is performed by using the printer 4. Conversely, it takes a lot of time for carrying the sheets to the finisher 700 when the copying is performed by using the printer 1.

In the present embodiment, in the image processing system that the device-located positions are specified, the number of copies distribution process based on the distribution priority order and the distribution limitation value in a case where the cluster copying is performed by using the three image output devices will be explained. It should be noted that the number of output copies has been previously set on the setting screen shown in FIG. 12, and also the device selection has been previously performed on the setting screen shown in FIG. 13 to perform the copying by using the printers 1, 2 and 3.

First, on the setting screen shown in FIG. 15, the limitation value of the printer 1 is set to "15", the limitation value of the printer 2 is set to "20", and the limitation value of the printer 3 is set to "30". As for how to determine the distribution priority order, although various setting methods can be devised, the following two settings based on the device positions will be explained.

The first setting is a "local output priority setting" by which the time for sheet collection can be minimized. In this setting, the distribution priority orders of the printers 1, 2 and 3 are set to "1", "2" and "3" respectively.

The second setting is a "finishing operation priority setting" by which the time for carrying the output sheets to the position of the finisher 700 can be minimized. In this setting, the distribution priority orders of the printers 1, 2 and 3 are set to "3", "2" and "1" respectively.

As explained in the first embodiment, either one of the priority order in the local output priority setting and the priority order in the finishing operation priority setting may be set on the setting screen shown in FIG. 15 and stored in the HDD of the output control apparatus if necessary.

However, in the present embodiment, as shown in a setting screen of FIG. 19, besides the distribution priority order actually used, a group name for each group composed of plural set values is previously given and registered, and the set values and the group names are stored in the storage device such as the HDD 2004 or the like. Then, when the cluster copying is performed, the setting values are designated by using the group name and read from the HDD if necessary, and the read values are set as the distribution priority order. Thus, the set values need not be input every time the distribution priority order is changed, whereby operability can be improved.

Figure 20:
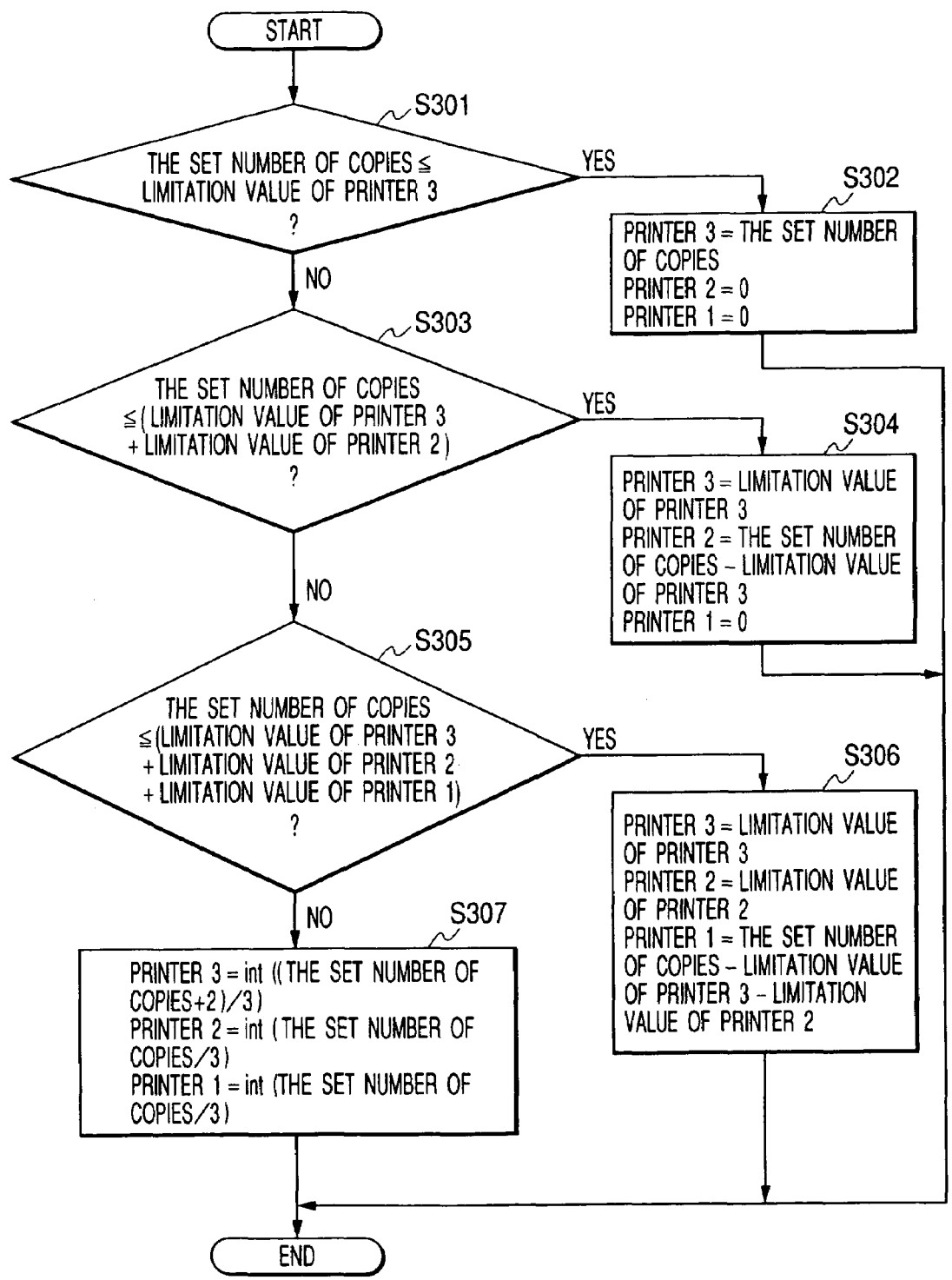
FIG. 20 is a flow chart showing an example of a processing procedure of the image processing system in the third embodiment.

FIG. 20 is a flow chart showing the automatic number of copies distribution processing procedure in a case where the priority order of each image output device is determined based on the finishing operation priority setting. It is assumed that such a procedure is performed by the CPU 2001 of FIG. 2 on the basis of a program stored in the ROM 2003, the HDD 2004 or another storage medium (not shown). Further, symbols S301 to S307 show respective steps.

First, in the step S301, the set number of output copies (hereinafter called the set number of copies) is compared with the limitation value of the printer 3, of which distribution priority order is highest. If it is judged that the set number of copies is smaller than or equal to the limitation value of the printer 3, the distribution is performed such that the set number of copies is entirely output by the printer 3 in the step S302. Namely, the number of copies to be distributed to the printer 3 is set to the set number of copies, while the number of copies to be distributed to the printers 2 and 1 is set to "0".

On the other hand, if it is judged in step S301 that the set number of copies is larger than the limitation value of the printer 3, in the step S303 the set number of copies is compared with the sum of the limitation value of the printer 3 and the limitation value of the printer 2.

If it is judged in step S303 that the set number of copies is smaller than or equal to the sum of the limitation value of the printer 3 and the limitation value of the printer 2, in the step S304 the number of copies to be distributed to the printer 3, of which distribution priority order is highest, is set to the limitation value of the printer 3, the remaining number of copies (i.e., the set number of copies−the limitation value of the printer 3) is completely distributed to the printer 2, and the number of copies to be distributed to the printer 1, of which distribution priority order is lowest, is set to "0".

Conversely, if it is judged in step S303 that the set number of copies is larger than the sum of the limitation value of the printer 3 and the limitation value of the printer 2, in the step S305 the set number of copies is compared with the sum of the limitation values of the three printers (i.e., the limitation value of the printer 3+the limitation value of the printer 2+the limitation value of the printer 1).

If it is judged in step S305 that the set number of copies is smaller than or equal to the sum of the limitation values of the three printers, in the step S306 the number of copies to be distributed to the printer 3, of which distribution priority order is highest, is set to the limitation value of the printer 3. Also, the number of copies to be distributed to the printer 2 is set to the limitation value of the printer 2, and the number of copies to be distributed to the printer 1, of which distribution priority order is lowest, is set to the remaining number of copies (i.e., the set number of copies−the limitation value of the printer 3−the limitation value of the printer 2).

Conversely, if it is judged in step S305 that the set number of copies is larger than the sum of the limitation values of the three printers, in the step S307, the process of equally distributing the number of copies to each of the printers 1, 2 and 3 is performed. Namely, the number of copies to be distributed to the printer 3 is set to a maximum integer not exceeding (the set number of copies+2)/3, while the number of copies to be distributed to the printers 1 and 2 is set to a maximum integer not exceeding (the set number of copies)/3.

In a case where the priority order of each image output device is determined based on the local output priority setting, the set values are the same as those in the finishing operation priority setting except that the priority order of the printer 1 is "1" and the priority order of the printer 3 is "3". Thus, the processing procedure in the local output priority setting can be explained as a procedure in which "printer 1" and "printer 3" of the above flow chart of FIG. 20 are replaced.

Figures 21, 22:
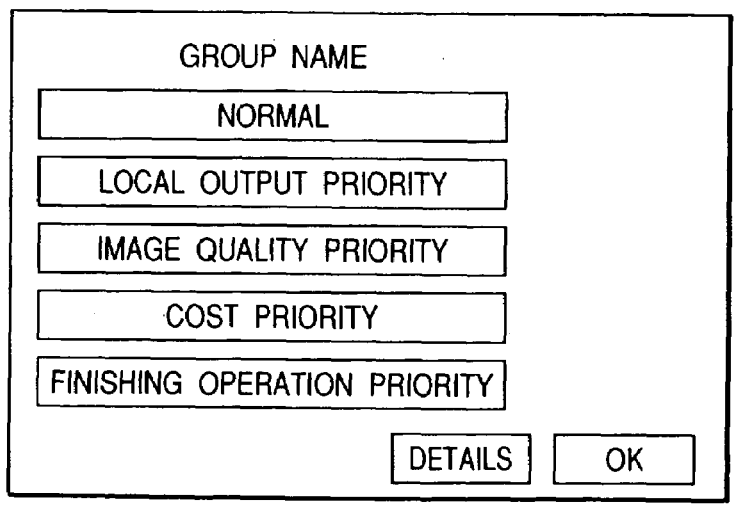
FIG. 21 is a diagram showing a distribution result in a case where a distribution process is performed based on the distribution priority order of "local output priority setting" and "finishing operation priority setting"
FIG. 22 is a diagram showing a distribution priority order setting screen in a case where the distribution priority order is set by selecting a group name.

FIG. 21 is a diagram showing the number of copies of the distribution for the printers 1, 2 and 3 in a case where the distribution process is performed based on the distribution priority order of "local output priority setting" and "finishing operation priority setting". In FIG. 21, it should be noted that the set numbers of copies are given as "10", "20", "30", "50" and "100".

When the set number of copies is "10", the numbers of copies to be distributed to the printers 1, 2 and 3 are set to "10", "0" and "0" respectively in the local output priority setting, while the numbers of copies to be distributed to the printers 1, 2 and 3 are set to "0", "0" and "10" respectively in the finishing operation priority setting.

When the set number of copies is "20", the numbers of copies to be distributed to the printers 1, 2 and 3 are set to "15", "5" and "0" respectively in the local output priority setting, while the numbers of copies to be distributed to the printers 1, 2 and 3 are set to "0", "0" and "20" respectively in the finishing operation priority setting.

When the set number of copies is "30", the numbers of copies to be distributed to the printers 1, 2 and 3 are set to "15", "15" and "0" respectively in the local output priority setting, while the numbers of copies to be distributed to the printers 1, 2 and 3 are set to "0", "0" and "30" respectively in the finishing operation priority setting.

When the set number of copies is "50", the numbers of copies to be distributed to the printers 1, 2 and 3 are set to "15", "20" and "15" respectively in the local output priority setting, while the numbers of copies to be distributed to the printers 1, 2 and 3 are set to "0", "20" and "30" respectively in the finishing operation priority setting.

When the set number of copies is "100", the numbers of copies to be distributed to the printers 1, 2 and 3 are set to "34", "33" and "33" respectively in the local output priority setting, while the numbers of copies to be distributed to the printers 1, 2 and 3 are set to "33", "33" and "34" respectively in the finishing operation priority setting.

In the present embodiment, when the set number of copies is "100", in step S307, the process of equally distributing the number of copies to each of the printers 1, 2 and 3 is performed. However, as shown in step S205 of the second embodiment, the process of distributing the number of copies according to the limitation value of each device may be performed. In this case, as indicated by the round brackets of FIG. 21, the numbers of copies to be distributed to the printers 1, 2 and 3 are set to "23", "30" and "47" respectively in the local output priority setting, while the numbers of copies to be distributed to the printers 1, 2 and 3 are set to "24", "30" and "46" respectively in the finishing operation priority setting.

After such a number of copies distribution process ends, the image data read by the image input device (scanner) 100 and the number of output copies determined in this process are transmitted together with an output command to each image output device, and the output process is then performed in each output device.

Therefore, when the cluster copying is performed, if the distribution process based on the finishing operation priority setting is performed, the number of copies can be preferentially distributed to the printer 3, of which distribution priority order is highest, and the time for carrying the output sheets to the finisher 700 can be saved.

If the distribution process based on the local output priority setting is performed, the number of copies can be preferentially distributed to the printer 1, of which distribution priority order is highest, and the time for collecting the output sheets can be saved.

In the present embodiment, the set number of copies distribution process based on the setting position of each device in the image processing system was explained. However, it is needless to say that the set number of copies distribution process according to the present invention is also applicable to a case where the distribution priority order is set based on, e.g., "image quality priority setting", "cost priority setting" and the like.

Further, according to the present embodiment, as shown in the setting screen of FIG. 19, in the distribution priority order setting in case of the cluster copying, the set values are previously registered with the corresponding group name and stored. Then, if necessary, the set values are read by designating the group name, whereby the distribution priority order can be set. However, as shown in FIG. 22, it is possible to display selectable group names on the setting screen as a list according to a combination of the plural printers selected as output destinations, select any one of the groups, read the set values corresponding to the selected group from the HDD, and then set the distribution priority order. By doing so, operability in the distribution priority order setting can be improved.

As explained above, in the present embodiment, according to the operator's request, the distribution process can be performed based on any one of the plural priority order settings previously stored, and output results complying with the operator's various requests can be obtained.

Hereinafter, the composition of a data processing program which can be read and executed by the image processing system to which the image output control apparatus according to the present invention is applicable will be explained with reference to a memory map shown in FIG. 23.

FIG. 23 is the diagram for explaining the memory map of a storage medium which stores various data processing programs capable of being read and executed by the image processing system to which the input control apparatus of the present invention is applicable.

It should be noted that, although not specifically shown, information for managing the program groups stored in the storage medium, e.g., version information, an author and the like may be stored, and information dependent on an OS and the like on the program reading side, e.g., icons and the like for discriminately displaying a program may be stored.

Further, data dependent on various kinds of programs may be managed in the directory. Further, if a program and data to be installed have been compressed, a program for decompressing them and the like may be stored.

The functions shown in FIGS. 16, 17 and 20 in the present embodiment may be implemented by the host computer using a program to be externally installed. In this case, the present invention is applied even in the case where information groups including programs are supplied to an output device by storage media such as a CD-ROM, a flash memory, an FD and the like or from external storage media through a network.

As described above, it is needless to say that the objects of the present invention can be attained as well by supplying storage media recording program codes of software for realizing the functions of the abovementioned embodiments to a system or an apparatus, and by the system or a computer (a CPU or an MPU) of the apparatus reading out to execute program codes stored in storage media.

In this case, the program codes themselves read from the storage media realize a novel function of the present invention, and thus the storage media storing the program codes constitutes the present invention.

As the storage media for supplying program codes, e.g., a floppy disk, a hard disk, an optical disk, a magnetooptical disk, a CD-ROM, a CD-R, a DVD ROM, a magnetic tape, a nonvolatile memory card, a ROM, an EEPROM, a silicon disk and the like may be used.

Further, it is needless to say that the functions of the above-mentioned embodiments are realized not only in a case where the program code read by the computer is executed, but also in a case where an OS (operating system) and the like running on the computer performs a part or all of the actual process based on the instruction of the program code and thus the functions of the above-mentioned embodiments are realized by such a process.

Further, it is needless to say that the functions of the above-mentioned embodiments are realized by a process that is actually performed in part or entirely by a CPU and the like provided in a function extension board or a function extension unit based on an instruction of a program code after the program code is read out from storage media and written in a memory provided in a function extension board inserted in a computer or a function extension unit connected to a computer.

Further, the present invention may be applied to a system composed of plural devices, or may be applied to an apparatus consisting of one device. Further, the present invention is naturally adaptable in a case where the present invention is attained by supplying a program to the system or the apparatus. In this case, the system or the apparatus can enjoy the effects of the present invention by reading the storage media in which the program represented by software for attaining the present invention is stored to the system or the apparatus.

Further, by downloading a program represented by software for attaining the present invention from a database on a network by a communication program and reading it, the system or the apparatus can enjoy effects of the present invention.

Although the present invention has been explained by using the preferred embodiments, the present invention is not limited to these embodiments. Namely, it is obvious that various modifications and changes are possible in the present invention without departing from the spirit and scope of the appended claims.

What is claimed is:

1. An image output control apparatus which is connected to a first image output device and a second image output device through a communication medium, and which can control image outputting by said first and second image output devices, the apparatus comprising:
   a display control unit adapted to display on a display unit a screen by which a user can input a limiting value of the number of output copies in the first image output device;
   a memory unit adapted to store the limiting value input by the user;
   a reception unit adapted to receive image data to be image-output and information representing the number of output copies; and
   an output mode selection unit adapted to select either one of a first image output mode for outputting the received image data by using the first image output device, and a second image output mode for outputting the received image data by using both the first and second image output devices,
   wherein said output mode selection unit selects the first image output mode when the number of output copies represented by the information received by said reception unit does not exceed the limiting value stored in said memory unit, and selects the second image output mode when the number of output copies represented by the information received by said reception unit exceeds the limiting value stored in said memory unit.

2. An image output control apparatus according to claim 1, further comprising:
   a selection unit adapted to select the second image output device from among plural image output devices; and
   a second memory unit adapted to store priority order information for each of the plural image output devices,
   wherein said selection unit selects the second image output device based on the priority order information stored in said second memory unit.

3. An image output control apparatus according to claim 2, wherein said second memory unit stores plural kinds of priority order information for the respective plural image output devices, and
   wherein said selection unit selects the second image output device based on the kind of priority order information designated by the user.

4. An image output control apparatus according to claim 1, wherein said display control unit displays on the display unit a screen by which the user can input a limiting value of the number of output copies in the second image output device.

5. An image output control apparatus according to claim 1, wherein when the second image output mode is selected, the first image output device executes image output of the output copies received by said reception unit until the number of output copies reaches the limiting value of the number of output copies in the first image output device, and the second image output device executes image output of the remaining output copies.

6. An image output control apparatus according to claim 4, wherein when the number of output copies received by said reception unit is larger than a sum of the limiting value of the number of output copies in the first image output device and the limiting value of the number of output copies in the second image output device, the second image output mode equally allocates the number of output copies to each of the first image output device and the second image output device.

7. An image output control apparatus according to claim 4, wherein when the number of output copies received by said reception unit is larger than a sum of the limiting value of the number of output copies in the first image output device and the limiting value of the number of output copies in the second image output device, the second image output mode allocates the number of output copies to each of the first and second image output devices at respectively changed allocation ratios based on the limiting values of the number of output copies of the first and second image output devices.

8. An image output apparatus which can communicate with another image output apparatus through a communication medium, the apparatus comprising:
   an operation unit adapted to enable a user to input a limiting value of the number of output copies in said image output apparatus;
   a memory unit adapted to store the limiting value input by the user through an operation of said operation unit;
   an input unit adapted to input image data to be image-output and information representing the number of output copies; and
   an output mode selection unit adapted to select one of a first image output mode for outputting the input image data by using said image output apparatus and a second image output mode for outputting the input image data by using both said image output apparatus and the other image output apparatus,
   wherein said output mode selection unit selects the first image output mode when the number of output copies represented by the information input by said input unit does not exceed the limiting value stored in said memory unit, and selects the second image output mode when the number of output copies represented by the information input by said input unit exceeds the limiting value stored in said memory unit.

9. An image output apparatus according to claim 8, further comprising:
   a selection unit adapted to select the other image output apparatus from among plural image output apparatuses; and
   a second memory unit adapted to store priority order information for each of the plural image output apparatuses,
   wherein said selection unit selects the other image output apparatus based on the priority order information stored in said second memory unit.

10. An image output apparatus according to claim 9, wherein said second memory unit stores plural kinds of priority order information for the respective plural image output apparatuses, and
    wherein said selection unit selects the other image output apparatus based on the kind of priority order information designated by the user.

11. An image output apparatus according to claim 8, wherein said operation unit enables the user to input a limiting value of the number of output copies in the other image output apparatus.

12. An image output apparatus according to claim 8, wherein when the second image output mode is selected, said image output apparatus executes image output of the output copies input by said input unit until the number of output copies reaches the limiting value of the number of output copies in said image output apparatus, and the other image output apparatus executes image output of the remaining output copies.

13. An image output apparatus according to claim 11, wherein when the number of output copies input by said input unit is larger than a sum of the limiting value of the number of output copies in said image output apparatus and the limiting value of the number of output copies in the other image output apparatus, the second image output mode equally allocates the number of output copies to each of said image output apparatus and the other image output apparatus.

14. An image output apparatus according to claim 11, wherein when the number of output copies input by said input unit is larger than a sum of the limiting value of the number of output copies in said image output apparatus and the limiting value of the number of output copies in the other image output apparatus, the second image output mode allocates the number of output copies to each of said image output apparatus and the other image output apparatus at respectively changed allocation ratios based on the limiting values of the number of output copies of said image output apparatus and the other image output apparatus.

15. An image output control method performed by a computing device, which can control image output by a first image output device and a second image output device connected through a communication medium, the method comprising:
    a display control step of displaying on a display unit a screen by which a user can input a limiting value of the number of output copies in the first image output device;

a storage step of storing the limiting value input by the user in a memory unit;

a reception step of receiving image data to be image-output and information representing the number of output copies; and an output mode selection step of selecting one of a first image output mode for outputting the received image data by using the first image output device and a second image output mode for outputting the received image data by using both the first and second image output devices, wherein said output mode selection step is adapted to select the first image output mode when the number of output copies represented by the information received in said reception step does not exceed the limiting value stored in the memory unit, and to select the second image output mode when the number of output copies represented by the information received in said reception step exceeds the limiting value stored in the memory unit.

16. An image output control method according to claim 15, further comprising:

a selection step of selecting the second image output device from among plural image output devices; and a second storage step of storing priority order information for each of the plural image output devices in the memory unit, wherein said selection step is adapted to select the second image output device based on the priority order information stored in the memory unit.

17. An image output control method according to claim 16, wherein said second storage step is adapted to store in the memory unit plural kinds of priority order information for the respective plural image output devices, and wherein said selection step is adapted to select the second image output device based on the kind of priority order information designated by the user.

18. An image output control method according to claim 15, wherein said display control step is adapted to display on the display unit a screen by which the user can input a limiting value of the number of output copies in the second image output device.

19. An image output control method according to claim 15, wherein when the second image output mode is selected, the first image output device executes image output of the output copies received in said reception step until the number of output copies reaches the limiting value of the number of output copies in the first image output device, and the second image output device executes image output of the remaining output copies.

20. An image output control method according to claim 18, wherein when the number of output copies received in said reception step is larger than a sum of the limiting value of the number of output copies in the first image output device and the limiting value of the number of output copies in the second image output device, the second image output mode equally allocates the number of output copies to each of the first image output device and the second image output device.

21. An image output control method according to claim 18, wherein when the number of output copies received in said reception step is larger than a sum of the limiting value of the number of output copies in the first image output device and the limiting value of the number of output copies in the second image output device, the second image output mode allocates the number of output copies to each of the first and second image output devices at respectively changed allocation ratios based on the limiting values of the number of output copies of the first and second image output devices.

22. A storage medium which computer-readably stores a program to execute an image output control method capable of controlling image output by a first image output device and a second image output device connected through a communication medium, said method comprising:

a display control step of displaying on a display unit a screen by which a user can input a limiting value of the number of output copies in the first image output device;

a storage step of storing the limiting value input by the user in a memory unit;

a reception step of receiving image data to be image-output and information representing the number of output copies; and an output mode selection step of selecting one of a first image output mode for outputting the received image data by using the first image output device and a second image output mode for outputting the received image data by using both the first and second image output devices, wherein said output mode selection step is adapted to select the first image output mode when the number of output copies represented by the information received in said reception step does not exceed the limiting value stored in the memory unit, and to select the second image output mode when the number of output copies represented by the information received in said reception step exceeds the limiting value stored in the memory unit.

* * * * *

UNITED STATES PATENT AND TRADEMARK OFFICE
CERTIFICATE OF CORRECTION

PATENT NO.         : 7,016,066 B2
APPLICATION NO. : 09/761759
DATED                 : March 21, 2006
INVENTOR(S)       : Ritsuko Otake It is certified that error appears in the above-identified patent and that said Letters Patent is hereby corrected as shown below:

COLUMN 1:
Line 46, "devices each," should read --devices, each--.

COLUMN 7:
Line 14, "an" should read --a--.

COLUMN 15:
Line 13, "211" should read --21--.

Signed and Sealed this

Nineteenth Day of June, 2007

JON W. DUDAS
*Director of the United States Patent and Trademark Office*